US011770063B2

(12) United States Patent
Atias et al.

(10) Patent No.: US 11,770,063 B2
(45) Date of Patent: Sep. 26, 2023

(54) POWER INVERTER WITH VOLTAGE CONTROL CIRCUITRY

(71) Applicant: Solaredge Technologies Ltd., Herzeliya (IL)

(72) Inventors: Matan Atias, Tel Aviv (IL); Liron Har-Shai, Tel Mond (IL)

(73) Assignee: Solaredge Technologies Ltd., Herzeliya (IL)

( * ) Notice: Subject to any disclaimer, the term of this patent is extended or adjusted under 35 U.S.C. 154(b) by 57 days.

(21) Appl. No.: 17/489,856

(22) Filed: Sep. 30, 2021

(65) Prior Publication Data

US 2022/0103058 A1     Mar. 31, 2022

Related U.S. Application Data

(60) Provisional application No. 63/085,457, filed on Sep. 30, 2020.

(51) Int. Cl.
*H02M 3/07* (2006.01)
*H02M 1/00* (2006.01)
*H02J 3/38* (2006.01)

(52) U.S. Cl.
CPC ........... *H02M 1/0022* (2021.05); *H02J 3/381* (2013.01); *H02M 1/007* (2021.05); *H02M 3/07* (2013.01); *H02J 2300/24* (2020.01)

(58) Field of Classification Search
CPC ................. H02M 7/10–106; H02M 3/07–073
See application file for complete search history.

(56) References Cited

U.S. PATENT DOCUMENTS

| | | | |
|---|---|---|---|
| 9,203,321 B1* | 12/2015 | Xiong | H05B 45/3725 |
| 10,141,788 B2* | 11/2018 | Karnstedt | H02J 50/12 |
| 11,159,016 B2* | 10/2021 | Yoscovich | H02J 3/381 |
| 11,258,261 B2* | 2/2022 | Yoscovich | H02J 3/381 |
| 2008/0266919 A1 | 10/2008 | Mallwitz | |
| 2009/0034304 A1 | 2/2009 | Engel et al. | |
| 2011/0084553 A1 | 4/2011 | Adest et al. | |
| 2012/0007576 A1 | 1/2012 | Suntio et al. | |
| 2012/0155139 A1* | 6/2012 | Boeke | H02M 7/217 323/311 |
| 2013/0229844 A1* | 9/2013 | Gazit | H02M 7/44 323/311 |

(Continued)

FOREIGN PATENT DOCUMENTS

| | | | | |
|---|---|---|---|---|
| DE | 202011102068 U1 * | 10/2012 | | H02J 3/381 |
| EP | 2339730 A1 * | 6/2011 | | H02M 3/22 |

(Continued)

OTHER PUBLICATIONS

Feb. 24, 2022—Extended EP Search Report—EP App. No. 21199900.8.

*Primary Examiner* — Sisay G Tiku
(74) *Attorney, Agent, or Firm* — Banner & Witcoff, Ltd.

(57) ABSTRACT

Systems, apparatuses, and methods are described for power conversion. In some examples, the power conversion may be done by an inverter configured to convert a direct current (DC) input to an alternating current (AC) output. The inverter may include a plurality of capacitors connected at the input of a DC/AC module. The system may include a housing configured to house the inverter. Voltage control circuitry may be configured to increase a voltage at the input of the DC/AC module inside the housing of the inverter.

20 Claims, 25 Drawing Sheets

(56) References Cited

U.S. PATENT DOCUMENTS

| | | | |
|---|---|---|---|
| 2013/0235628 A1* | 9/2013 | Dong | H02M 7/797 |
| | | | 363/47 |
| 2014/0084894 A1 | 3/2014 | Lubomirsky | |
| 2014/0268908 A1* | 9/2014 | Zhou | H02M 7/5381 |
| | | | 363/37 |
| 2016/0085255 A1* | 3/2016 | Gazit | H02M 7/44 |
| | | | 323/311 |
| 2017/0255218 A1* | 9/2017 | Gazit | H02M 7/44 |
| 2020/0176991 A1* | 6/2020 | Dai | H02J 3/388 |
| 2020/0177087 A1* | 6/2020 | Warnes | H02M 3/33553 |
| 2020/0212806 A1* | 7/2020 | Levi | H02M 7/4833 |

FOREIGN PATENT DOCUMENTS

| | | | | |
|---|---|---|---|---|
| EP | 3993243 A1 * | 5/2022 | | H02J 3/381 |
| JP | 7140629 B2 * | 9/2022 | | |
| WO | WO-2011027300 A2 * | 3/2011 | | H02M 3/1584 |
| WO | WO-2015063898 A1 * | 5/2015 | | B60L 15/007 |
| WO | WO-2021090522 A1 * | 5/2021 | | B21D 37/00 |

\* cited by examiner

POWER INVERTER WITH VOLTAGE CONTROL CIRCUITRY

BACKGROUND

Electrical power conversion may be done to convert electrical energy from one form to another. Power conversion of electrical energy may include: changing a voltage to another voltage, changing a frequency to another frequency, converting between alternating current (AC) and direct current (DC), etc. An electric power converter is a device used for converting electrical energy. One way of classifying power conversion is according to whether the input and output are AC or DC. DC to DC converters may convert power from a source of DC from one voltage level to DC at another voltage level. There may be certain rules that dictate what voltage levels are permitted for a given source and given load.

SUMMARY

The following presents a simplified summary of certain features. The summary is not an extensive overview and is not intended to identify key or critical elements.

Systems, apparatuses, and methods are described for electrical power conversion.

In some examples, electrical power conversion may be done by an inverter configured to convert a direct current (DC) input to an alternating current (AC) output. The inverter may include a plurality of capacitors connected in series at the input of a DC/AC module. The system may include a housing configured to house the inverter. A converter may be configured to increase a voltage at the input of the DC/AC module inside the housing of the inverter. As an example, the voltage inside the housing may be greater than a threshold of voltage that is permitted outside of the housing of the inverter.

In some examples, the system may be configured to control a voltage at a midpoint terminal of an inverter. The system may be configured to control the voltage according to a neutral output terminal of the inverter. The system may be configured to control the voltage according to a positive or negative input terminal of the inverter.

In some examples, the system may be configured to maintain a positive voltage with respect to a ground potential or a negative voltage with respect to a ground potential at each output terminal of a power source that is connected to an input of an inverter.

In some examples, the system may be configured to switch between different modes of configuration, for example: an above ground potential voltage-boost configuration mode, a below ground potential voltage-boost configuration mode, a non-voltage-boost configuration mode, etc.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
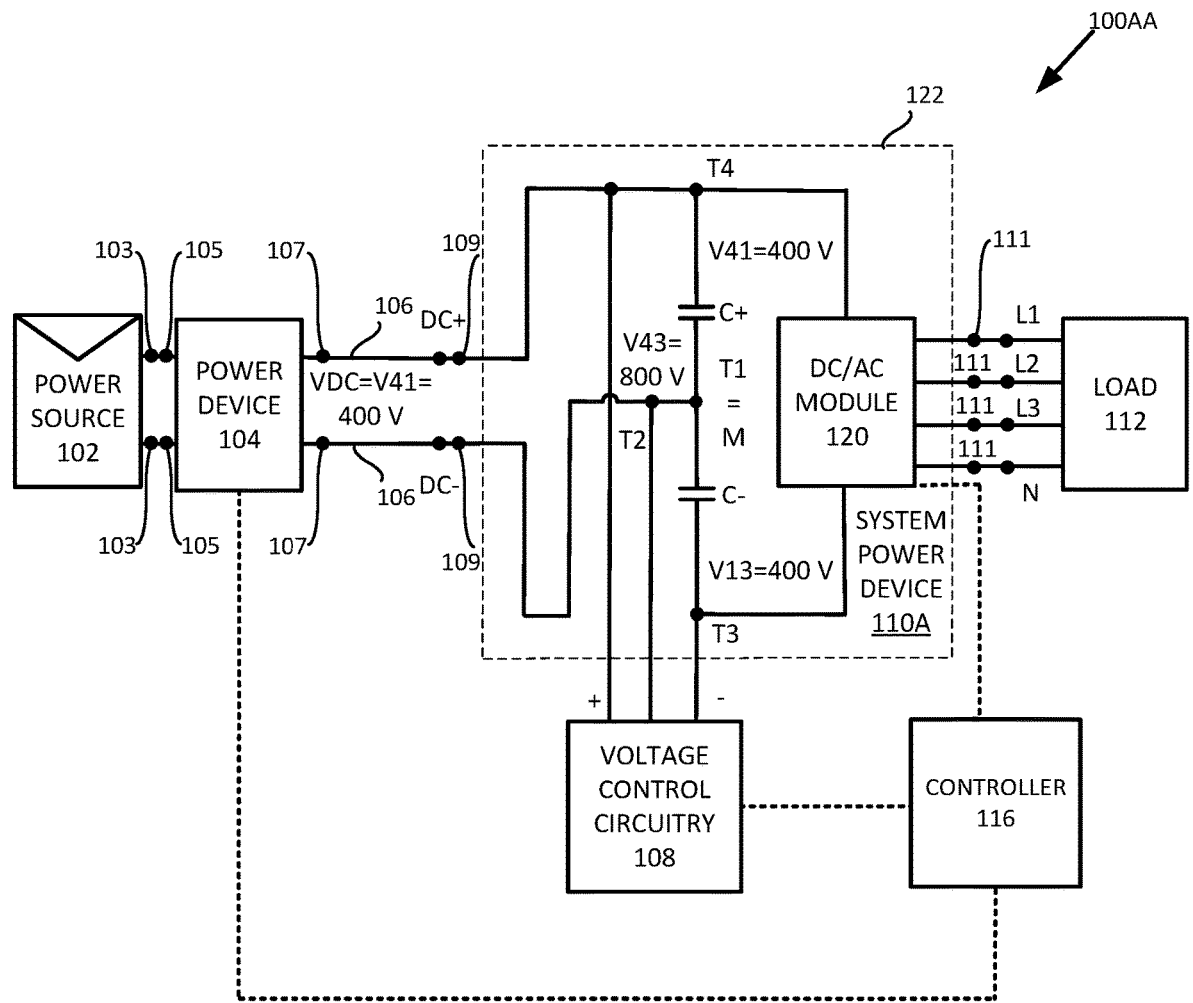
FIG. 1A shows a power system with an above ground potential configuration.

Systems, apparatuses, and methods are described herein for electrical power conversion. In some examples, the electrical power conversion is performed by a power system with an inverter configured to convert a direct current (DC) input power to an alternating current (AC) output power. The inverter may include a plurality of capacitors connected in series at the input of a DC/AC module. The system may include a housing configured to house the inverter. The housing is also referred to herein as "housing of the inverter", and may be considered part of the inverter. The housing may house converter circuitry of the inverter. The converter circuitry may be configured to convert power. The converter circuitry may include the DC/AC module. Voltage control circuitry may be configured to increase a voltage at the input of the DC/AC module inside the housing of the inverter. As an example, the voltage inside the housing may be greater than a threshold of voltage that is permitted outside of the housing of the inverter. The voltage control circuitry may include a converter.

In some examples, the system may be configured to control a voltage at a midpoint terminal between a plurality of capacitors of an inverter. The plurality of capacitors may be a plurality of series-connected capacitors that are serially connected to one another. The system may be configured to control the voltage according to a neutral output terminal of the inverter.

In some examples, the power system may be configured to maintain either a positive voltage (e.g., with respect to a ground potential) or a negative voltage (e.g., with respect to a ground potential) at each output terminal of a power source that is connected to an input of an inverter. For example, in some cases each output terminal of the power source may be maintained at a positive voltage potential with respect to ground. As another example, each output terminal of the power source may be maintained at a negative voltage potential with respect to ground.

In some examples, the power system may be configured to switch between different modes of configuration, for example: an above ground potential voltage-boost configuration mode, a below ground potential voltage-boost configuration mode, a non-voltage-boost configuration mode, etc. In the above ground potential voltage-boost configuration mode, the system may be configured to increase a voltage across, and maintain a positive voltage potential at, the power source output terminals with respect to a ground reference. In the below ground potential voltage-boost configuration mode, the system may be configured to increase a voltage across, and maintain a negative voltage potential at, the power source output terminals. In the non-voltage-boost configuration mode, the system may be configured to disconnect at least some of the voltage control circuitry, and thus, would not increase a voltage inside the housing of the inverter.

The term "ground" and "ground potential" used herein may refer to a reference voltage. For example, ground potential may be an actual earth potential (e.g., electrically connected to earth) or a virtual earth potential.

The accompanying drawings, which form a part hereof, show examples of the disclosure. It is to be understood that the examples shown in the drawings and/or discussed herein are non-exclusive and that there are other examples of how the disclosure may be practiced.

It is noted that the presently disclosed subject matter is not bound by the systems and apparatuses described with reference to the figures. Equivalent and/or modified functionality may be consolidated or divided in another manner and may be implemented in any appropriate combination. For example, power source 102 and power device 104, which are shown as separate units (shown, for example, in FIG. 1A), may have their functionalities and/or components combined into a single unit. As another example, power device 104 and system power device 110A, which are shown as separate units (shown, for example, in FIG. 1A), may have their functionalities and/or components combined into a single unit. As another example, one or more switches S shown internal to housing 122 may be arranged external to housing 122. For example switch SA shown internal to housing 122 in FIG. 5A and FIG. 5B may be arranged external to housing 122.

It is also noted that the presently disclosed subject matter is not bound by the flow charts shown in the figures, and the shown operations may occur out of the shown order. For example, operations that are shown in succession may be executed substantially concurrently or in reverse order. It is also noted that while the flow charts are described with reference to elements shown herein, this is by no means binding, and the operations may be performed by elements other than those described herein.

It is also noted that like references, or similar references, in the various figures refer to like elements throughout the application. For example, it is to be understood that voltage control circuitry 108 shown in FIG. 1A may be similar or the same as other voltage control circuitry described and shown herein, and vice versa. Throughout the application, certain general references may be used to refer to any of the specific related elements. For example, power system 100 may refer to any of the various power systems (e.g., 100AA, 100AB, 100B), power device 104 may refer to any of the various power devices, system power device 110 may refer to any of the various system power devices (e.g., 110A, 110B, 110C, 110D, 110E, 110F, 110G, 110H, 110I, 110J, 110K, 110L), etc.

It is also noted that all numerical values given in the examples of the description are provided for purposes of example only and are by no means binding.

The terms, "substantially", "about", and, "threshold", used herein include variations that are equivalent for an intended purpose or function (e.g., within a permissible variation range). Certain values or ranges of values are presented herein with numerical values being preceded by the terms "substantially", "about", and, "threshold". The terms "substantially", "about", and "threshold", are used herein to provide literal support for the exact number that it precedes, as well as a number that is near to or approximately the number that the term precedes. In determining whether a number is near to or approximately a specifically recited number, the near or approximating un-recited number may be a number, which, in the context in which it is presented, provides a substantial equivalent of the specifically recited number.

The term "controller" used herein may include a computer and/or other appropriate processing circuitry and memory. The terms "computer" and "processor" and variations thereof should be expansively construed to cover any kind of hardware-based electronic device with data processing capabilities including, by way of non-limiting example, one or more digital processing devices (e.g., digital signal processor (DSP), microcontroller, field programmable circuit, application-specific integrated circuit (ASIC), etc.), one or more devices which comprise or are operatively connected to one or more digital processing devices, and/or an analog circuit implementing control logic. The "computer" or "processor" may include memory and/or hardware registers that are operatively connected to the one or more digital processing devices. The memory and/or hardware registers may store configuration information and/or computer executable instructions that when read and interpreted by the one or more digital processing devices, cause the system or apparatus, including the one or more digital processing devices, to perform the steps and operations described herein. The terms "memory" and "data storage device" used herein should be expansively construed to cover any volatile or non-volatile computer memory suitable to the presently disclosed subject matter. The above may include, by way of non-limiting example, the one or more controllers 116 disclosed in the present application.

FIG. 1A to FIG. 10C show examples of various power systems 100 with voltage control circuitry 108 according to examples of the present subject matter.

Reference is now made to FIG. 1A, which shows a power system 100AA according to examples of the present subject matter. Power system 100AA may include one or more power sources 102. The one or more power sources 102 are also referred to herein as "power sources 102", and a respective power source of the one or more power sources 102 is also referred to herein as "power source 102".

As an example, power system 100AA may be a photovoltaic (PV) power system, and the power sources 102 may be PV generators. For example, each power source 102 may be one or more photovoltaic cells, one or more strings of serially connected photovoltaic cells, a photovoltaic panel, or one or more photovoltaic panels. As an example, a power source 102 may include series-connected or parallel-connected strings of serially connected photovoltaic cells. Also as an example, a power source 102 may include photovoltaic panels that are series-connected and/or parallel-connected to one another. Although power sources 102 are described herein in the context of PV generators, the term "power source" may include other types of appropriate power sources, for example: wind turbines, hydro-turbines, fuel cells, batteries, etc. As an example, where power source 102 may be a storage device, such as a battery, the power system 100 may be arranged so that elements of the power system provide an electrical current to the power source 102 in order to charge power source 102.

Although only a single power source 102 is shown in FIG. 1A for the sake of simplicity, the one or more power sources may include a plurality of power sources 102 connected to each other in series and/or parallel connections. For example, the one or more power sources 102 may include a plurality of strings (also referred to as serial strings or series strings) of power sources 102, where each string of power sources 102 includes a plurality of power sources 102 connected to each other in series. Each of the strings of power sources 102 may be connected to the other strings of power sources 102 in parallel.

Figure 1B:
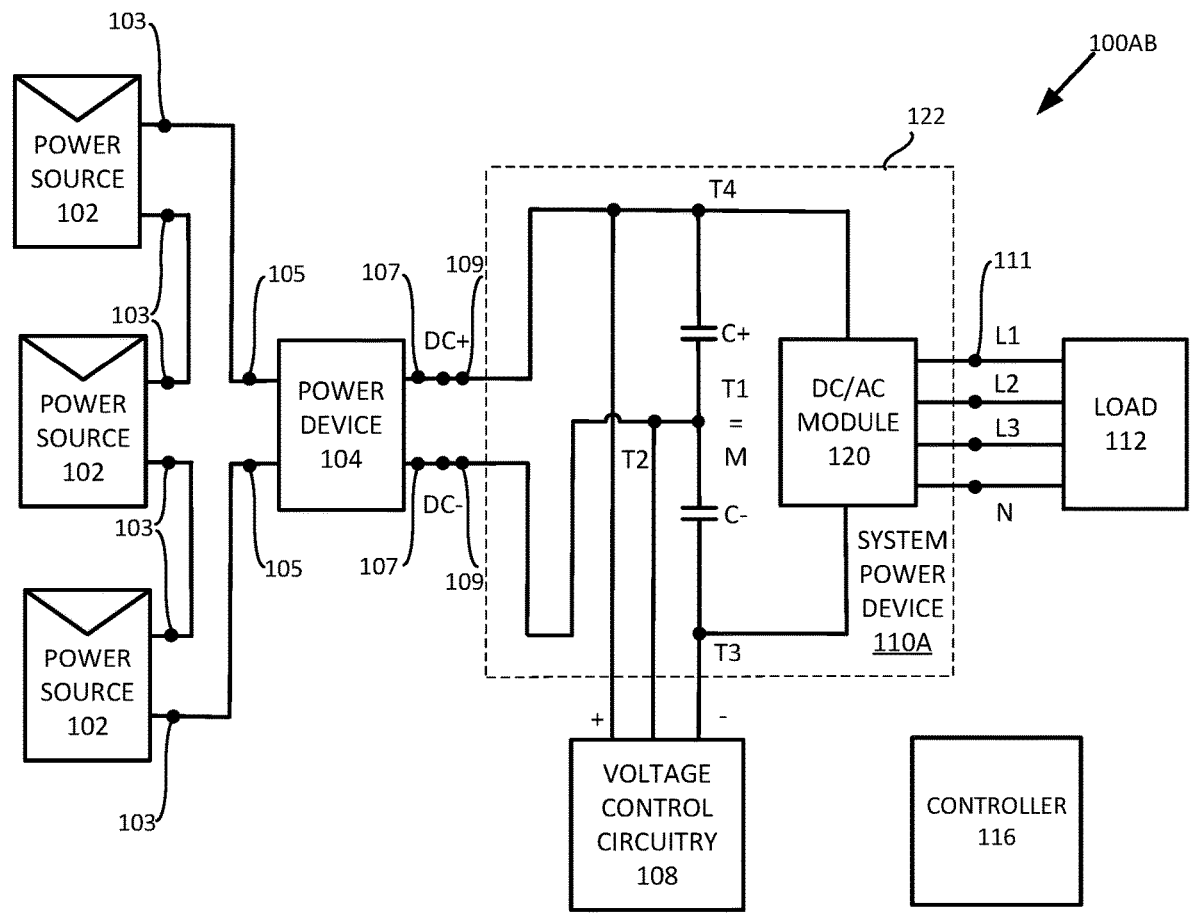
FIG. 1B shows a power system with a plurality of power sources.

Referring to FIG. 1B, a power system 100AB is shown with a plurality of power sources 102 connected to each other in series. The plurality of power sources 102 may also be referred to as a series string of power sources 102. The series string of power sources 102 is connected to power device 104. In some examples a plurality of series strings of power sources 102 may be connected in parallel to each other, and the parallel connection connected to power device 104.

Figure 1C:
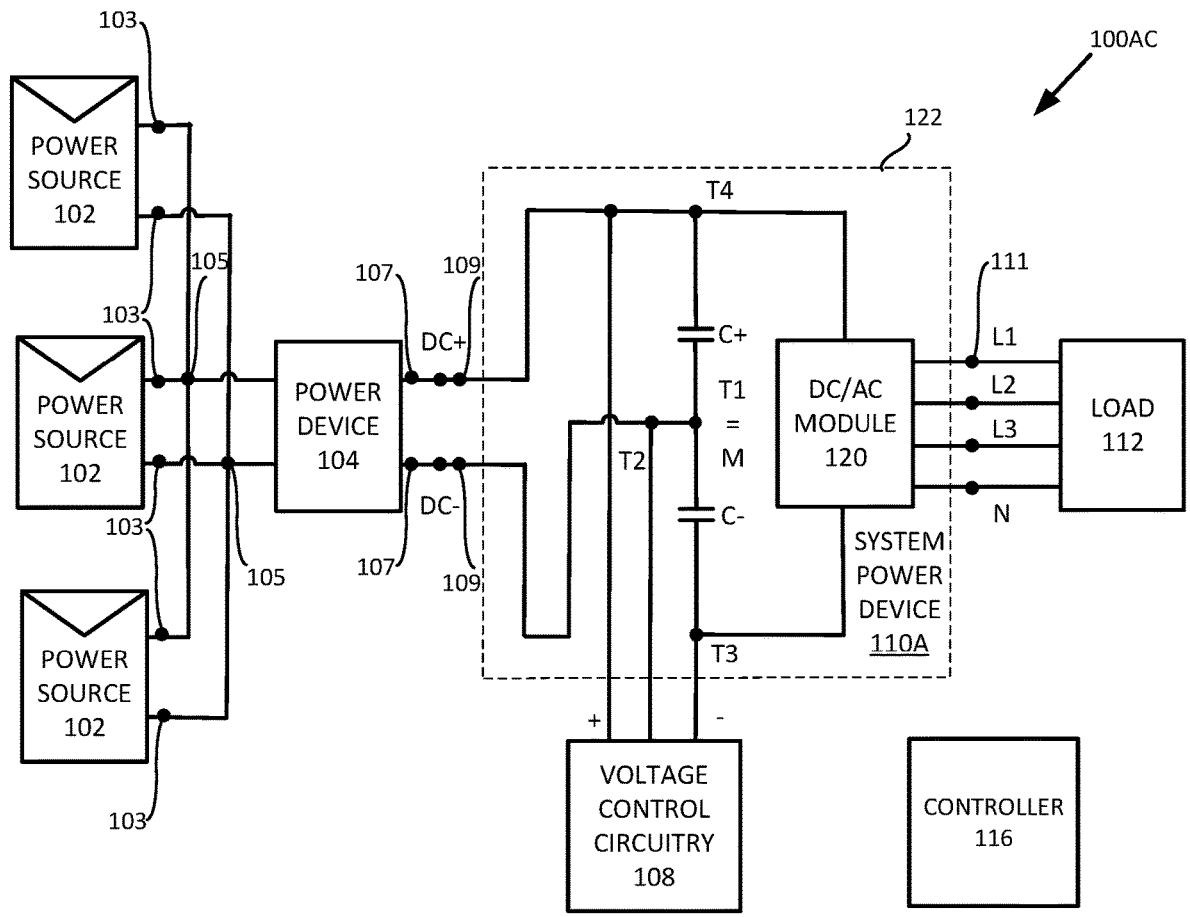
FIG. 1C shows a power system with a plurality of power sources.

Referring to FIG. 1C, a power system 100AC is shown with a plurality of power sources 102 connected to each other in parallel. The plurality of power sources 102 is connected to power device 104.

Referring back to FIG. 1A, each power source 102 may include a plurality of output terminals 103 configured to connect the power source 102 to one or more power devices 104 or one or more system power devices 110A. In the example of FIG. 1A power source 102 is connected to power device 104. Power device 104 is connected to system power device 110A. System power device 110A is connected to load 112. In FIG. 1A, output terminals 103 of the power source 102 are connected to input terminals 105 of power device 104. Output terminals 107 of power device 104 are connected to terminals DC+, DC− of bus 106. Input terminals 109 of system power device 110A are also connected to terminals DC+, DC− of bus 106. In this way output terminals 107 of power device 104 are connected to input terminals 109 of system power device 110A. Output terminals 111 of system power device 110A are connected to load 112. In the example of FIG. 1A system power device has four output terminals 111 connected to load 112. One respective output terminal 111 for each of three different output phase terminals L1, L2, L3 and an output terminal 111 for a neutral output terminal N. For simplicity the references to some of the output terminals 111 are omitted from other figures. Bus 106 may be a conductor that helps connect elements of the power system 100. Bus 106 may help distribute voltage between elements of the power system 100. Bus 106 may correspond to one or more physical busbars or other conducting elements. Bus 106 may include a plurality of terminals for connecting a plurality of elements of the power system 100.

The one or more power sources 102 may be connected to one or more respective power devices 104 in series, parallel, or some other combination with respect to each other. The one or more power devices 104 are also referred to herein as "power devices 104", and a respective power device of the one or more power devices 104 is also referred to herein as "power device 104". As mentioned above, each power device 104 may include a plurality of input terminals 105 configured to connect one or more power sources 102 to the power device 104. As an example, where power source 102 may be a storage device that is able to store an electrical charge, the power device 104 may be a bi-directional power device 104 arranged so that the power source 102 may be provided an electrical current in order to charge power source 102. Meaning, in some examples the current may flow through the power device 104 in a direction from the power source 102 or in a direction to the power source 102.

The power devices 104 may include, for example, one or more DC to DC converters (e.g., buck converter, boost converter, buck/boost converter, buck+boost converter, or combination thereof), DC to AC inverters, micro-inverters, AC to DC rectifiers, etc. As mentioned above, in some examples one or more power devices 104 may be internal to the system power device 110 (e.g., inside a housing 122 of the system power device 110).

In some examples, each power device 104 may include a plurality of converters, power stages, or sub-converters. The plurality of converters may be located inside a single shared housing or enclosure of the power device 104 (i.e., inside the same housing or enclosure as each other). In some examples, the plurality of converters may be located on the same printed circuit board (PCB) (e.g., which may be located inside the single shared housing or enclosure of the power device 104).

The one or more power sources 102 or one or more power devices 104 may be connected to one or more system power devices 110A. The housing 122 of the one or more system power devices is shown using broken lines in FIG. 1A. The one or more system power devices 110A may include the elements enclosed inside the housing 122. The one or more system power devices 110A are also referred to herein as "system power devices 110A", and a respective system power device of the one or more system power devices 110A is also referred to herein as "system power device 110A". System power devices 110 of other power systems 100 may be referred to in a similar fashion (e.g., system power devices 110B, system power device 110B, etc.) Outputs of the power devices 104 may be connected to one another in series, parallel, or a combination of serial and parallel connections. For example, the power devices 104 may be connected to one another at their outputs, with at least one output terminal of a first power device being connected to at least one other output terminal of a second power device. The power devices 104 may be connected in a series connection forming a series string of power devices 104. The series string of power devices 104 may be connected to the one or more system power devices 110A via a bus 106 (e.g., a DC bus). DC bus 106 may have a high side connected to a first input terminal of system power device 110A, and a low side connected to a second input terminal of system power device 110A. While one system power device 110A is shown in FIG. 1A, multiple system power devices 110 may be connected to bus 106 in the same manner. In the example of FIG. 1A, power device 104 is connected to the high side of DC bus 106 and a first input of system power device 110A at terminal DC+. Power device 104 is connected to the low side of DC bus 106 and a second input of system power device 110A at terminal DC−.

Figure 1D:
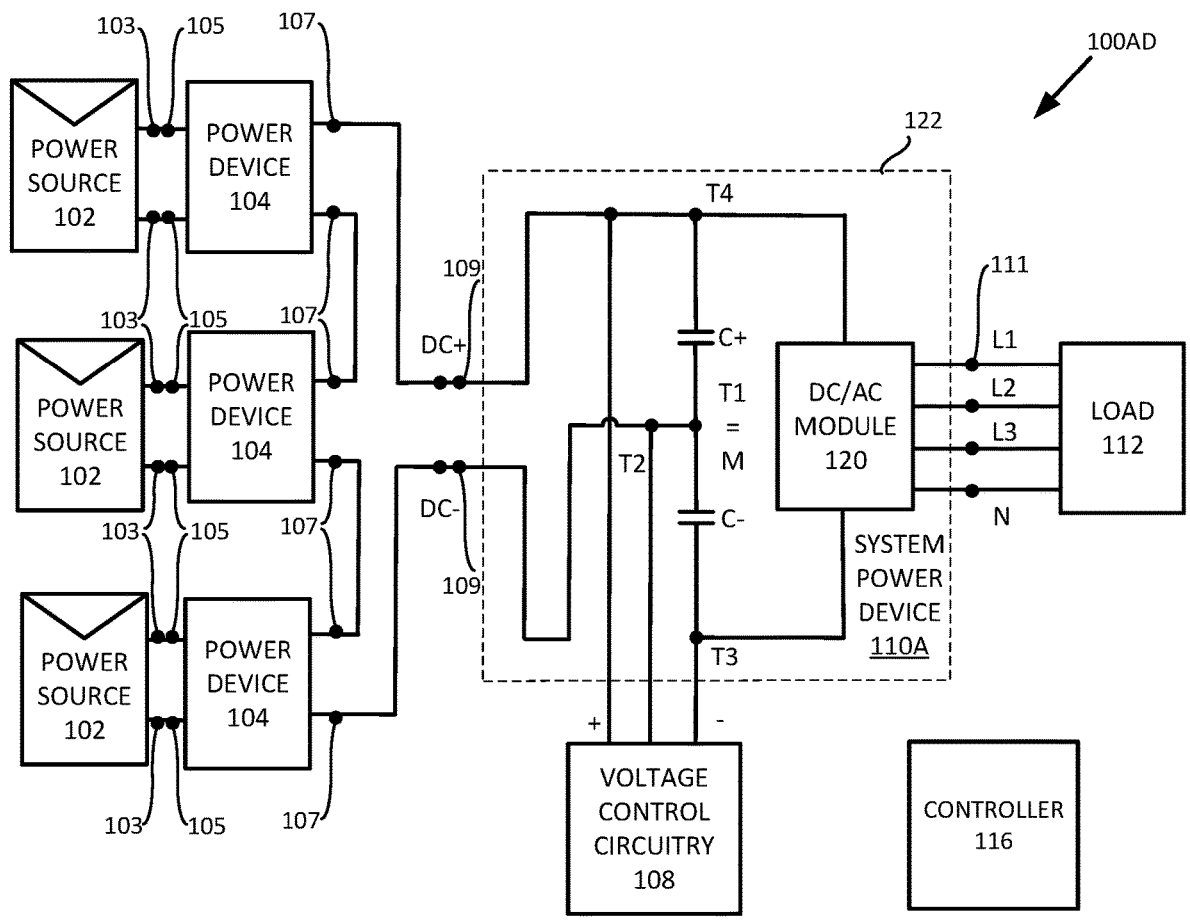
FIG. 1D shows a power system with a plurality of power devices.

Referring to FIG. 1D, a power system 100AD is shown with a plurality of power devices 104 connected at their outputs to each other in series, which may also be referred to as a series string of power devices 104. The series string of power devices 104 may be connected to system power device 110A. In some examples, a plurality of series strings of power devices 104 may be connected in parallel to one or more system power devices 110A (e.g., via a bus 106). For the sake of simplicity, each power device 104 is shown in FIG. 1D as being connected to a single power source 102, but, in some examples, one or more power devices 104 of the plurality of power devices 104 may each be connected to a plurality of power sources 102 as described above.

Figure 1E:
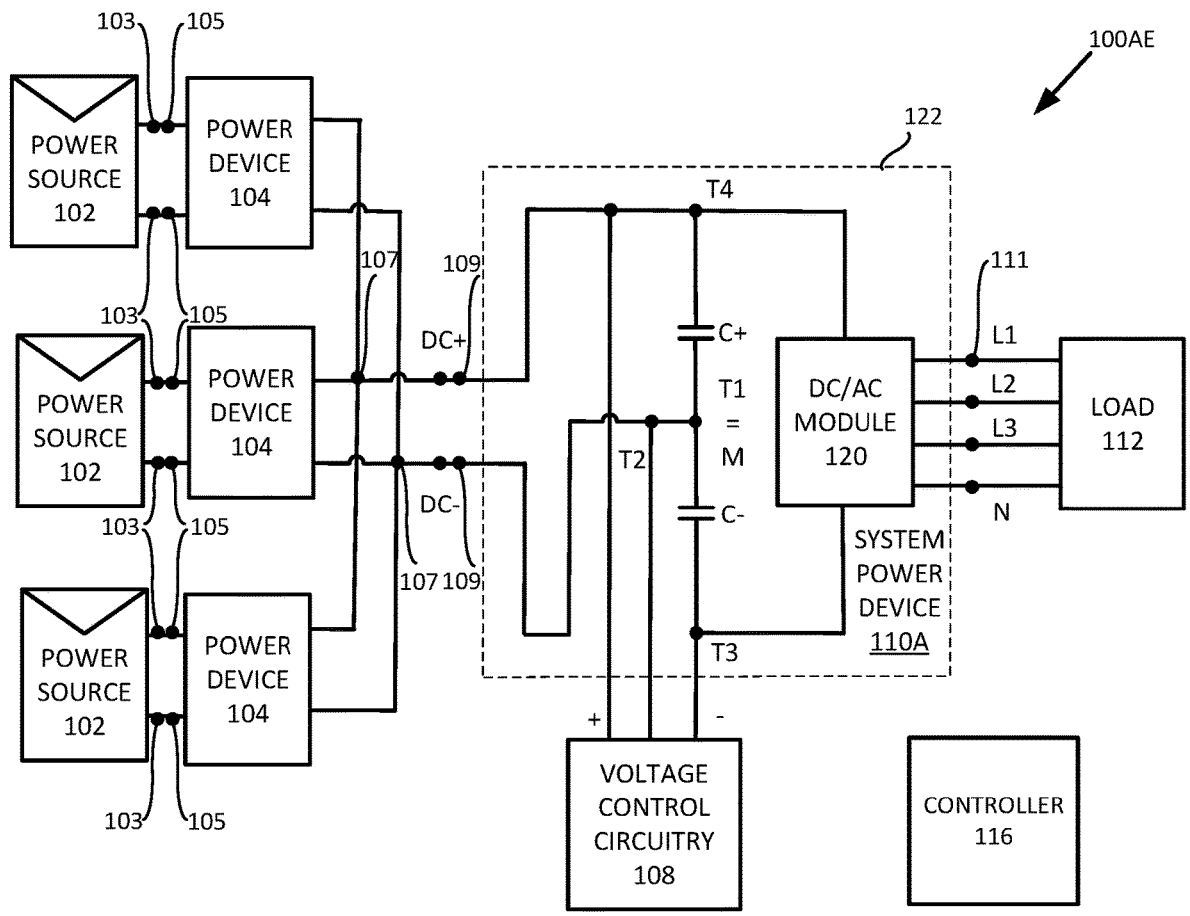
FIG. 1E shows a power system with a plurality of power devices.

Referring to FIG. 1E, a power system 100AE is shown with a plurality of power devices 104 connected at their outputs to each other in parallel. The plurality of power devices 104 may be connected to system power device 110A, for example, via a bus 106. For the sake of simplicity, each power device 104 is shown in FIG. 1E as being connected to a single power source 102, but, in some examples, one or more power devices 104 of the plurality of power devices 104 may be connected to a plurality of power sources 102 as described above.

In a case where power devices 104 are not included in the power system, then the power sources 102 may be connected directly to one or more system power devices 110, via DC bus 106, in a manner similar to the ones described above with respect to connecting the power devices 104 to the one or more system power devices 110A.

Referring back to FIG. 1A, the system power devices 110 may include, for example, one or more DC to DC converters (e.g., buck converter, boost converter, buck/boost converter, and/or buck+boost converter, combinations thereof, etc.), DC to AC inverters, combiner and/or monitoring boxes, etc. Each system power device 110 may include a DC/AC module 120. The DC/AC module 120 may include circuitry configured to convert a DC input to an AC output. For example, the system power device 110 may include an inverter for one or more phases (e.g., one phase inverter, two phase inverter, three phase inverter, etc.). As mentioned above, in the example shown in FIG. 1A, system power device 110A has four output terminals 111 with four output lines, including a first AC phase output terminal L1, a second AC phase output terminal L2, a third AC phase output terminal L3, and a neutral output terminal N.

As an example, where power source 102 may be an energy storage device, the system power device 110 may be a bi-directional system power device 110 that is arranged so the power source 102 may be provided an electrical current in order to charge power source 102. For example, DC/AC module 120 may also be configured to convert an AC input to a DC output. As such, in some examples the current may flow through the system power device 110 in a direction from the power source 102 or in a direction to the power source 102.

Each system power device 110 may include a plurality of capacitors, including C+ and C−, which may be connected across the input of the DC/AC module 120. For example, one capacitor C+ may be connected to input terminal T4 of DC/AC module 120, and another capacitor C− may be connected to input terminal T3 of DC/AC module. Capacitor C+ and capacitor C− may be connected to each other at a terminal T1. Terminal T1 may also be referred to herein as midpoint terminal M or midpoint terminal T1. The term "midpoint terminal" used herein refers to a terminal located between a plurality of capacitors that are connected to each other in series. For the sake of simplicity, only two capacitors, C+ and C−, are shown in FIG. 1A, but system power device 110 may have more than two capacitors, for example, by having multiple capacitors connected in series between terminal T4 and terminal T1, and/or multiple capacitors connected in series between terminal T1 and terminal T3 (as shown, for example, in FIG. 3). In some examples, the plurality of capacitors may include a plurality of parallel-connected capacitors (not shown).

Figure 12:
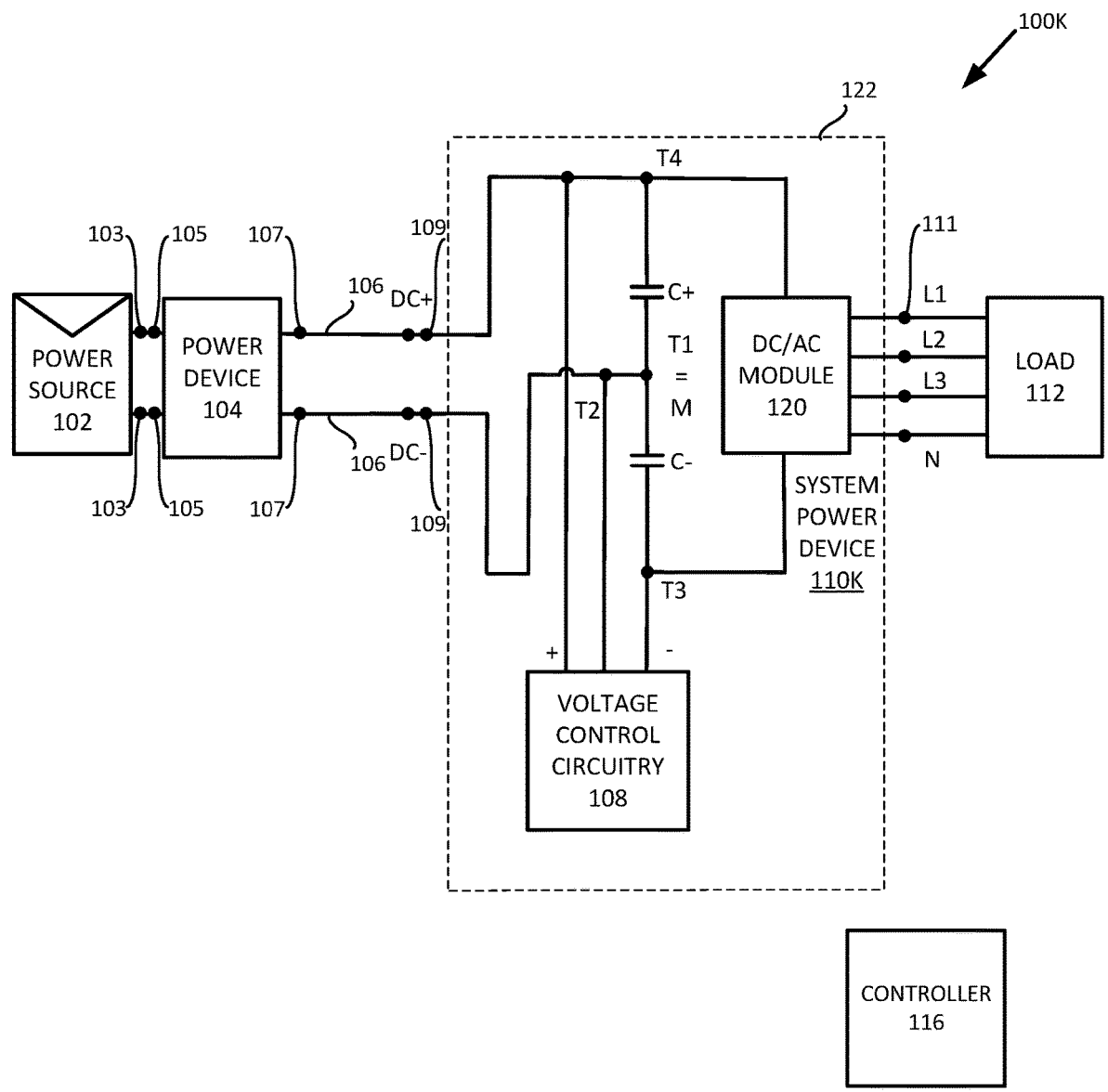
FIG. 12 shows a power system with the voltage control circuitry internal to the system power device housing.

Housing 122 may be configured to contain the system power device 110. For example, housing 122 may be an enclosure configured to hold the plurality of capacitors (e.g., C+ and C−) and the DC/AC module 120 of the system power device 110. In other variations, housing 122 may be configured to hold other components of power system 100, such as voltage control circuitry 108, and/or power device 104. As an example, FIG. 12 shows a power system 100K where the system power device 110K and the voltage control circuitry 108 may be both located internal to housing 122. Such an arrangement may be possible in other power systems 100 shown and described herein without all of the options being shown for the sake of brevity.

Housing 122 may be a physical structure configured to physically surround and encompass at least some of the elements of system power device 110. As mentioned above, housing 122 may also surround at least some other elements of the system 100. As an example, housing 122 may be configured to house the DC/AC module 120, the plurality of capacitors C, one or more switches, etc.

Voltage control circuitry 108 may be configured to control a voltage. For example, voltage control circuitry 108 may be configured to adjust the voltage across the input terminals T3 and T4 of DC/AC module 120. Voltage control circuitry 108 may be configured to substantially double the voltage across the input to DC/AC module 120. For example, if the voltage across the input terminals T3, T4 of DC/AC module 120 is about 400 volts without voltage control circuitry 108 operating, then voltage control circuitry 108 may be configured to double that voltage to about 800 volts across the input terminals T3 and T4 of DC/AC module 120. Voltage control circuitry 108 may be configured to increase voltage according to a certain efficiency. Voltage control circuitry 108 may also be configured to control the voltage at the midpoint M of system power device 110. For example, voltage control circuitry 108 may be configured to control the voltage at the midpoint M according to a voltage of the neutral output terminal N.

Voltage control circuitry 108 may include a plurality of terminals connected to system power device 110. In the example shown in FIG. 1A, voltage control circuitry 108 includes a plurality of terminals connected across the input of the DC/AC module 120 including a first terminal connected to terminal T4 and a second terminal connected to terminal T3. Voltage control circuitry 108 also includes a third terminal connected to terminal T2 of the system power device 110A. Terminal T2 may be connected to, and be at, substantially the same potential as terminal T1, which is the midpoint terminal M between the plurality of capacitors C+ and C−. In some examples, terminal T1 and terminal T2 may be the same terminal.

Figure 13:
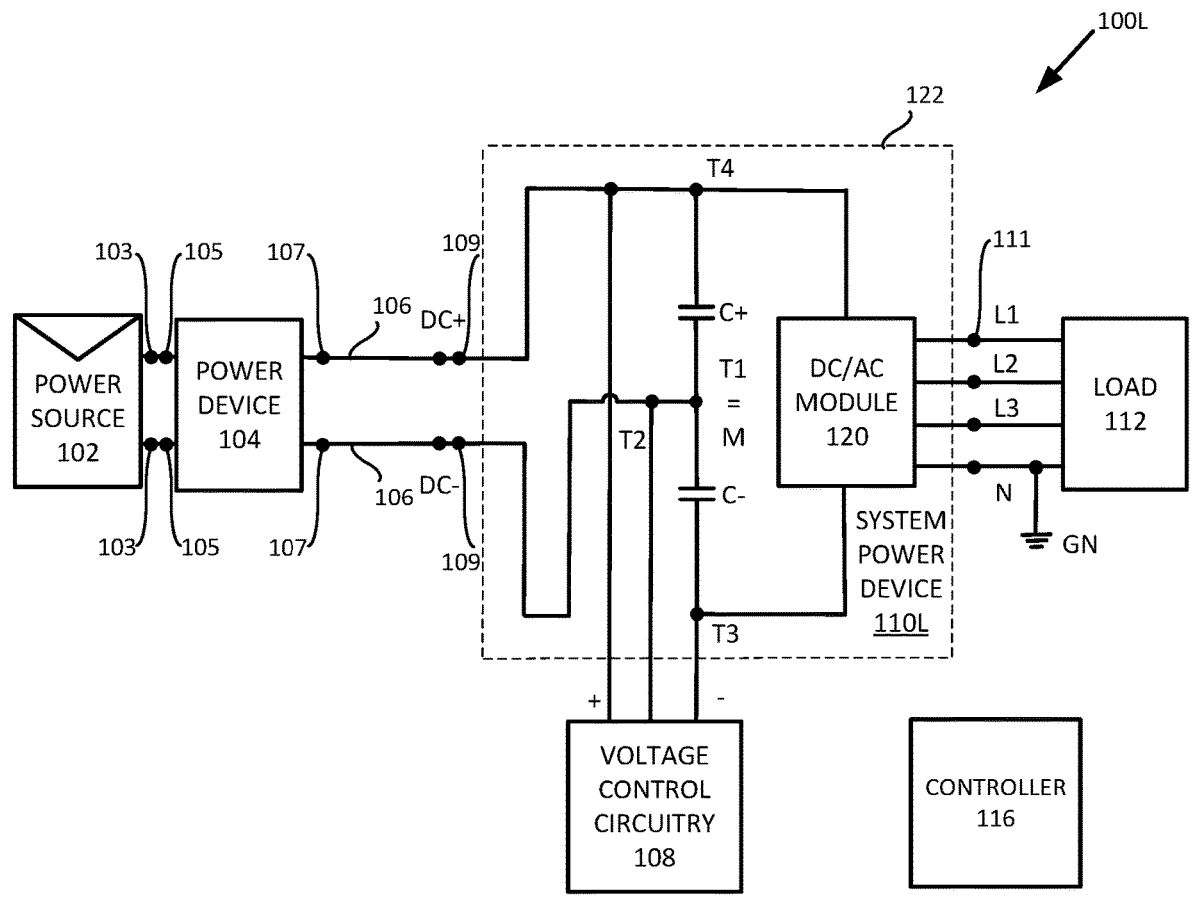
FIG. 13 shows a ground connection in a power system.

In some examples, voltage control circuitry 108 may be configured to maintain a positive voltage or a negative voltage with respect to a ground potential (for example, the neutral point N) at each output terminal of a power source 102 that is connected to system power device 110. For example, the voltage at both terminals 103 may be a positive voltage with respect to the ground potential, or the voltage at both terminals 103 may be a negative voltage with respect to the ground potential. In some examples, the ground potential may be an actual earth potential (e.g., electrically connected to earth) or a virtual earth potential. FIG. 13 shows a power system 100L where the neutral point N that is connected to system power device 110L is connected to an actual earth potential represented by ground GN. Such an arrangement may be possible in other power systems 100 shown and described herein without all of the options being shown for the sake of brevity.

Figure 2:
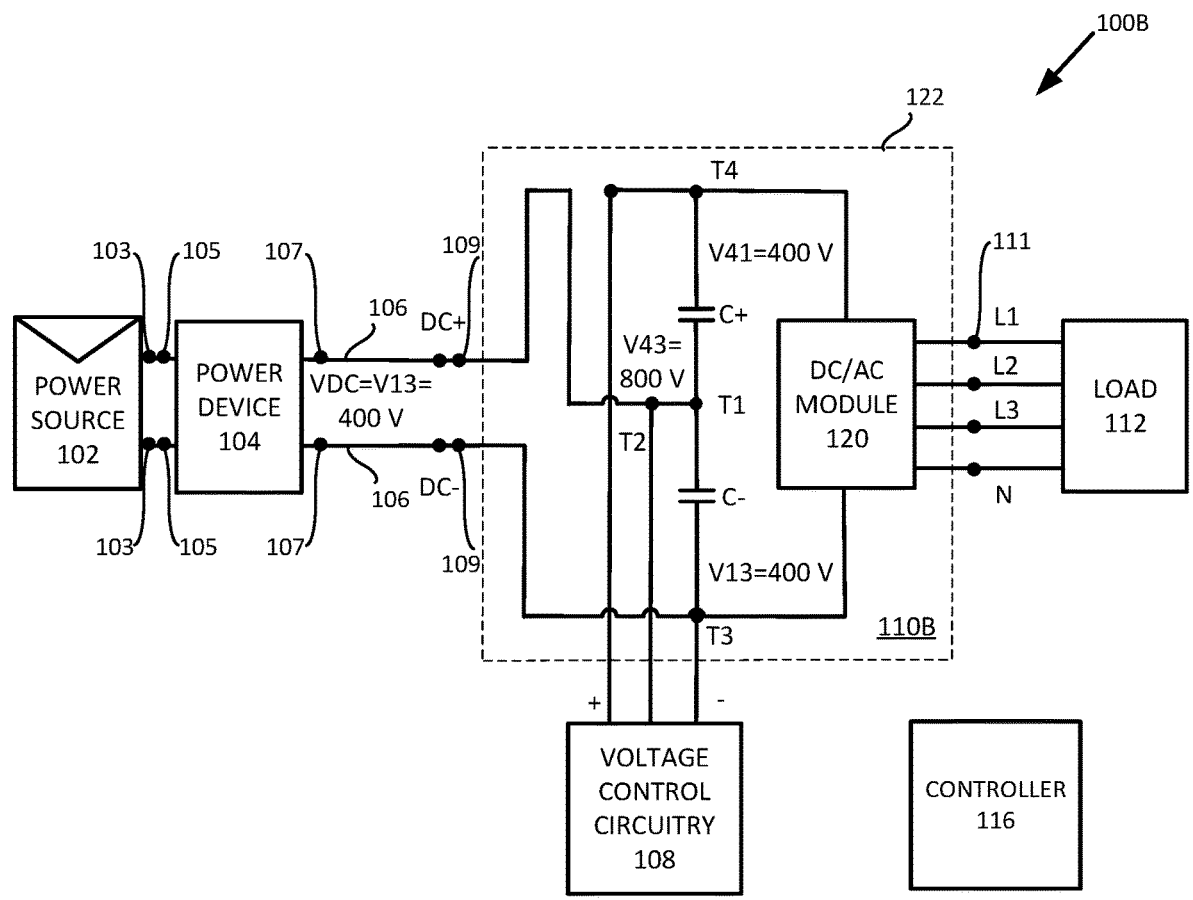
FIG. 2 shows a power system with a below ground potential configuration.

In the examples shown in FIGS. 1A-1E, power system 100 (e.g., 100AA, 100AB, 100AC, 100AD, 100AE) may be in an above ground potential configuration, where voltage control circuitry 108 is configured to maintain a positive voltage with respect to a ground potential at each output terminal of power source 102, and/or each terminal of bus 106. As shown in FIG. 1A, in the above ground potential configuration, system power device 110A may be connected to power source 102 and/or power device 104 via terminal DC+ and terminal DC− of bus 106. Terminal T4 may be connected to terminal DC+, and terminal T2 (and/or terminal T1) may be connected to terminal DC−. In the example shown in FIG. 2, power system 100B may be in a below ground potential configuration, where voltage control circuitry 108 is configured to maintain a negative voltage with respect to a ground potential at each output terminal of power source 102. As shown in FIG. 2, in the below ground potential configuration, system power device 110B may be connected to power source 102 and/or power device 104 via terminal DC+ and terminal DC− of bus 106. Terminal T2 may be connected to terminal DC+, and terminal T3 may be connected to terminal DC−.

With reference to FIG. 1A, the high side of DC bus 106 may be connected to terminal T4 via terminal DC+, and the low side of DC bus 106 may be connected to the midpoint terminal M via terminal DC−. This configuration may enable voltage control circuitry 108 to maintain the voltage at terminal DC+ and the voltage at terminal DC− as zero and/or positive voltages with respect to a ground potential (for example, the neutral point N).

Voltage control circuitry 108 may include circuitry described in U.S. Patent Application Number U.S. 62/955, 627, incorporated herein by reference, and attached hereto as appendix A. For example, voltage control circuitry 108 may include a voltage doubler circuit that is configured to convert an input voltage to an output voltage that is about double the value of the input voltage.

The voltage control circuitry 108 may include, for example, one or more DC to DC converters (e.g., buck converter, boost converter, buck/boost converter, buck+ boost converter, combinations thereof), DC to AC inverters, micro-inverters, AC to DC rectifiers, etc.

As an example, a design parameter (e.g., as specified in safety regulations or required by component wire insulation capability) may specify that the voltage external to housing 122 of system power device 110 does not exceed a voltage threshold (e.g., a voltage threshold of about 600 volts across terminal DC+ and terminal DC− of bus 106). However, it may be advantageous for the voltage, that is input internal to system power device 110, to be a relatively larger voltage (e.g., about 800 volts across terminal T4 and terminal T3 at the input to DC/AC module 120). Providing a relatively larger voltage internal to the system power device 100 may help the system power device 100 operate with greater efficiency. The voltage control circuitry 108 may be configured to control the voltage that is input to the DC/AC module 120 so that the voltage across the input to the DC/AC module 120 is a relatively larger voltage (e.g., about 800 volts) than what is provided at the input to system power device 110 (e.g., via bus 106). In this way, the power system 100AA may be configured so that there is a relatively high input voltage to the DC/AC module 120, of system power device 110, since the relatively high voltage is internal to the housing 122 of the system power device 110. In this way, the voltage that is external to the housing 122 does not exceed a voltage threshold (e.g. a voltage at one or more external input of system power device 110).

For example, the voltage control circuitry 108 may be configured to control the voltage between terminal T4 and terminal T3, that is internal to the housing 122 of system power device 110, to be about 800 volts (e.g., voltage V43=about 800 volts). Voltage control circuitry 108 may also be configured to control the voltage on the DC bus 106 between terminal DC+ and terminal DC− to be about equal to the voltage between terminal T4 and terminal T1 (e.g., voltage VDC=voltage V41=about 400 volts), which, for example, may be about half of the voltage across terminal T4 and terminal T3. In this example, the voltage between terminal T1 and terminal T3 may also be about half of the voltage across terminal T4 and terminal T3 (e.g., voltage V13=about 400 volts). The voltage control circuitry 108 may also be configured to control the voltage at the midpoint terminal T1 relative (e.g., equal) to the neutral output line N of the system power device 110.

As an example, voltage control circuitry 108 may be configured to help one or more power sources 102 and/or power device 104 reach about a certain voltage. For example, voltage control circuitry 108 may be configured to help a series strings of power sources 102 (for example, as shown in FIG. 1B), a series string of power devices 104 (for example, as shown in FIG. 1D), or a series string with a mix of power sources 102 and power devices 104, to reach about a certain voltage. The certain voltage may be a threshold voltage. For example, the certain voltage may be a DC threshold voltage needed to produce a certain AC voltage for a three-phase power system. For example, the three-phase power system may be a power system that has about 400 volts AC with each line of the three lines having about 230 volts AC. In some examples, in order to produce such an AC voltage, the DC voltage input to the DC/AC module 120 may be a relatively high DC voltage (e.g., about 600 volts DC or about 800 volts DC). If the series strings of power sources 102, series string of power devices 104, or mixed series string needs help to reach that certain voltage, then voltage control circuitry 108 may be configured to help boost the DC voltage produced by the series string. The voltage control circuitry 108 may therefore help relatively shorter series strings to reach a relatively higher voltage that without the voltage control circuitry 108 may be produced by a relatively longer series string. For example, if in a case where the system does not have voltage control circuitry 108 so that a relatively longer series string of about 10 to 15 powers sources 102 and/or power devices 104 may be used to reach the certain voltage, then by including voltage control circuitry 108 a relatively shorter series string of about 6 to 9 powers sources 102 and/or power devices 104 may be used to reach the certain voltage with the help of the voltage control circuitry 108. Relatively shorter series strings may advantageously require fewer power sources 102 and/or fewer power devices 104 than relatively longer series strings.

As mentioned above, voltage control circuitry 108 may also be configured to control the voltage in such a way that the voltage at each output terminal of the power source 102 is maintained as either positive or negative with respect to ground potential (e.g., at the neutral line N). For example, in the example shown in FIG. 1A, the power system 100AA may be configured to maintain a positive voltage with respect to ground potential at each output terminal of the power source 102. In the example shown in FIG. 2, the power system 100B may be configured to maintain a negative voltage with respect to ground potential at each output terminal of the power source 102.

If the voltage at one output terminal of a power source 102 is positive and the voltage at another output terminal of a power source 102 is negative, then there may be an issue of potential induced degradation (PID) in the power source 102 (e.g. PV panel). However, by maintaining each output terminal 103 of the power source 102 either above ground potential or below ground potential, then PID is mitigated.

Maintaining each of the output terminals 103 of the power source 102 either above ground potential or below ground potential in order to mitigate PID may depend on properties of one or more of the power sources 101. For example, one or more of the power sources 102 may be photovoltaic panels having properties where PID is reduced by maintaining the photovoltaic panels at a voltage above zero with respect to ground potential. Alternatively, one or more of the power sources 102 may be photovoltaic panels having properties where PID is reduced by maintaining the photovoltaic panels at a voltage below zero with respect to ground potential. As an example, the one or more power sources 102 may be one or more photovoltaic panels that operate more efficiently when the voltage is maintained above a ground potential (a positive voltage). Alternatively, the one or more power sources 102 may be one or more photovoltaic panels that operate more efficiently when the voltage is maintained below a ground potential (a negative voltage). For example, the photovoltaic panels may be p-type panels that have p-type cells which may be doped with boron that has one less electron than silicon which may make the cells positively charged. Alternatively, the photovoltaic panels may be n-type panels that have n-type cells which may be doped with phosphorus that has one more electron than silicon which may make the cells negatively charged. For example, the p-type panels with the positively-doped silicon cells p-type cells may be maintained at a positive voltage above ground potential (with a negative terminal connected to ground potential) to mitigate PID, and the n-type panels with negatively-doped silicon cells n-type cells may be maintained at a negative voltage below ground potential (with a positive terminal connected to ground potential) to mitigate PID. In some examples, a system may have both p-type panels and n-type panels, and the voltage of those panels may be maintained either above ground potential or below ground potential according to the types of the different panels. In some examples, a single panel may have both p-type cells and n-type cells, and the voltage of those cells may be maintained either above ground potential or below ground potential accordingly.

The system power devices 110 may be connected to one or more loads 112. The one or more loads 112 may include, for example, one or more of an electrical grid (e.g., AC electrical grid), storage device (e.g., battery systems), resistive device (e.g., resistors), inductive device (e.g., motors), etc.

Power system 100AA may include one or more controllers 116. A given controller 116 may be configured to transmit and receive one or more signals to or from one or more other controllers 116, and/or one or more other elements of power system 100AA. The one or more signals may include one or more instructions related to power conversion. The one or more controllers 116 may be configured to communicate using any appropriate communication methods and devices, including Power Line Communication (PLC), ZIGBEE™, Wi-Fi, etc. If power system 100AA includes a plurality of controllers 116, then one or more of those controllers 116 may be designated as a master controller. As an example, the functionality of the master controller may be included in one or more controllers 116 or may be included as part of power devices 104, voltage control circuitry 108, and/or system power devices 110, which may be in separate housings, or arranged in different combinations in one or more common housings (for example, in housing 122). For example, power devices 104 and/or voltage control circuitry 108 may have a plurality of controllers 116, and one or more of those controllers 116 may be designated as the master controller. For example, each power device 104 and/or voltage control circuitry 108 may have its own controller 116 with or without an external central controller, and one or more of those internal controllers may be designated as the master controller. In some cases, one or more controllers 116 included in the system power devices 110 may be designated as the master controller. For simplicity, FIG. 1A shows controller 116 as a central controller external to power devices 104, voltage control circuitry 108, and system power devices 110.

The one or more controllers 116 may include processing circuits and memory storing computer executable instructions for controlling the processing circuits and storing data. The one or more controllers 116 may be configured to access data and make determinations. This data may include one or more parameters and/or parameter data related to power system 100AA.

One or more sensors (not shown) may be configured to obtain one or more parameters and/or parameter data related to power system 100AA. These one or more parameters may include, for example, current, voltage, power, temperature, irradiance, etc.

As mentioned above, the one or more controllers 116 of power system 100AA may be configured to transmit and receive instructions as signals to or from one or more other elements of the power system 100AA. In some examples, power devices 104, system power devices 110, and/or one or more sensors, may be communicatively and/or operably connected to the one or more controllers 116. For example, the one or more sensors may provide data to the one or more controllers 116. As an example, connections between the controller 116 and other elements of power system 100AA are shown in FIG. 1A. In FIG. 1A the connections between the controller and the power device 104, voltage control circuitry 108, and system power device 110A (e.g., DC/AC module 120) are shown using dashed lines. For simplicity, the connections between the one or more controllers 116 and the other elements of other power systems 100 are not shown in other figures. However, the one or more controllers 116 of those power systems 100 may be connected to, for example, power devices 104, voltage control circuitry 108, system power devices 110, one or more sensors, one or more switches, etc.

Some examples of power systems shown herein might not include the controller 116 and power devices 104 for the sake of simplicity, but they may be included as shown in FIG. 1A.

FIG. 2 shows a power system 100B according to examples of the present subject matter. Power system 100B may be similar to other power systems 100 shown herein, except that, as mentioned above, power system 100B is configured in a below ground potential configuration. In the below ground potential configuration, the high side (with relatively higher voltage) of DC bus 106 may be connected to the midpoint terminal M via terminal DC+, and the low side (with relatively lower voltage) of DC bus 106 may be connected to terminal T3 via terminal DC−. This configuration may help voltage control circuitry 108 maintain the voltage at terminal DC+ and the voltage at terminal DC− as zero and/or negative voltages with respect to a ground potential. For example, if voltage control circuitry 108 controls the voltage across terminal T4 and terminal T3 to be about 800 volts and also controls the voltage at the midpoint terminal T1 relative (e.g., equal) to the neutral output terminal N, then the voltage on the DC bus 106 between terminal DC+ and terminal DC− may be about equal to the voltage between terminal T1 and terminal T3 (e.g., voltage VDC=voltage V13=about 400 volts), which may be about half of the voltage across terminal T4 and terminal T3 (e.g., voltage V43=about 800 volts), and may be a zero or negative voltage with regards to ground since that voltage is negative relative to the voltage of the neutral output N (which may be used to control the voltage at midpoint terminal T1). In this example, the voltage between terminal T4 and terminal T1 may also be about half of the voltage across terminal T4 and terminal T3 (e.g., voltage V41=about 400 volts), and may be a positive voltage with regards to ground since that voltage is positive relative to the voltage of the neutral output N. However, in this example the positive voltage V41 is not used to maintain the voltage at the output terminals 103 of power source 102 as positive voltages. Rather, the negative voltage V13 is used to maintain the voltage at the output terminals 103 of power source 102 as negative voltages.

Figure 3:
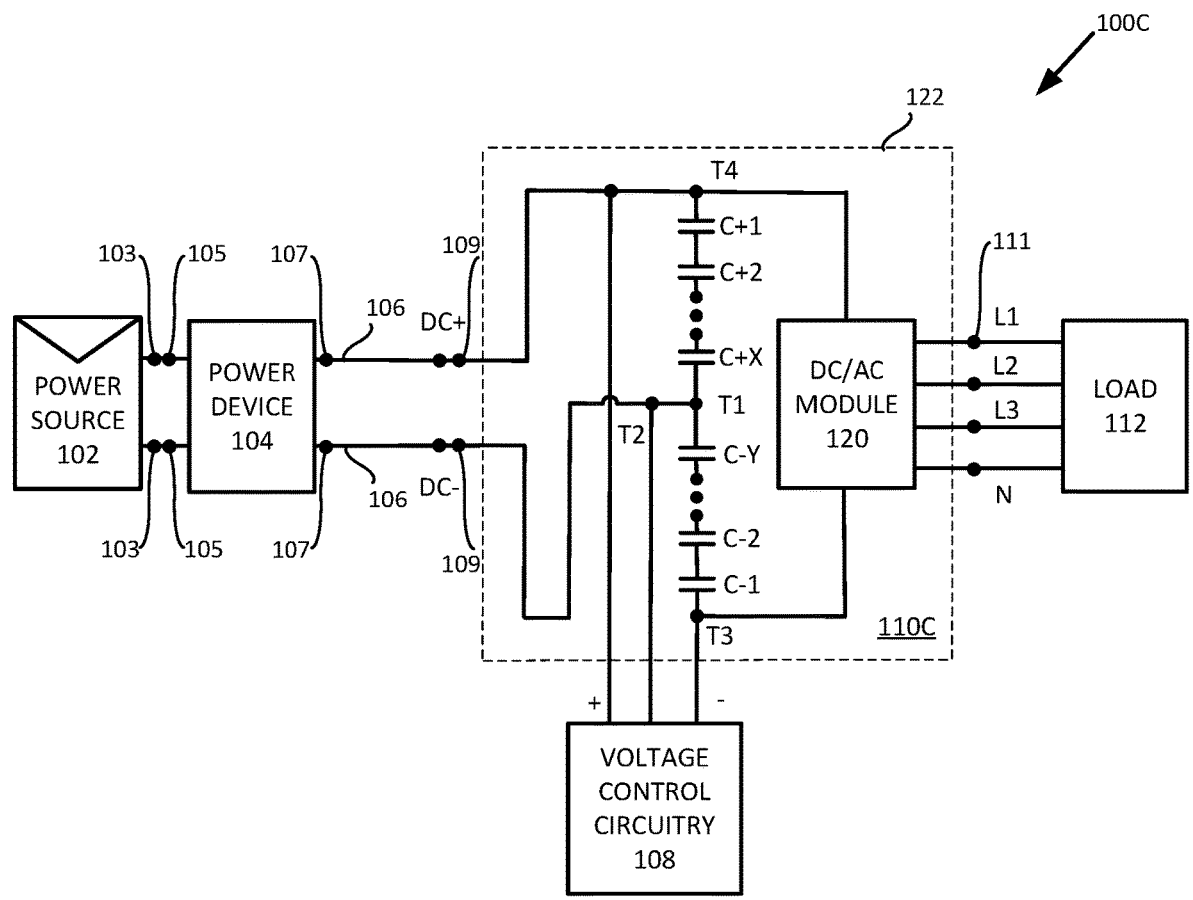
FIG. 3 shows a power system.

FIG. 3 shows a power system 100C similar to other power systems 100 shown herein, except that power system 100C includes a plurality of capacitors, X+Y, where X and Y may be any appropriate numbers, or may be the same or different number. As an example, there may be an even number of capacitors (e.g., where X is an even number) serially connected between terminal T4 and midpoint terminal T1. Similarly, there may be an even number of capacitors (e.g., where Y is an even number) serially connected between terminal T3 and midpoint terminal T1. Similar to power system 100AA, power system 100C is configured in an above ground potential configuration. The arrangement of system power device 110C may be similar to the arrangement of system power device 110A.

Figure 4:
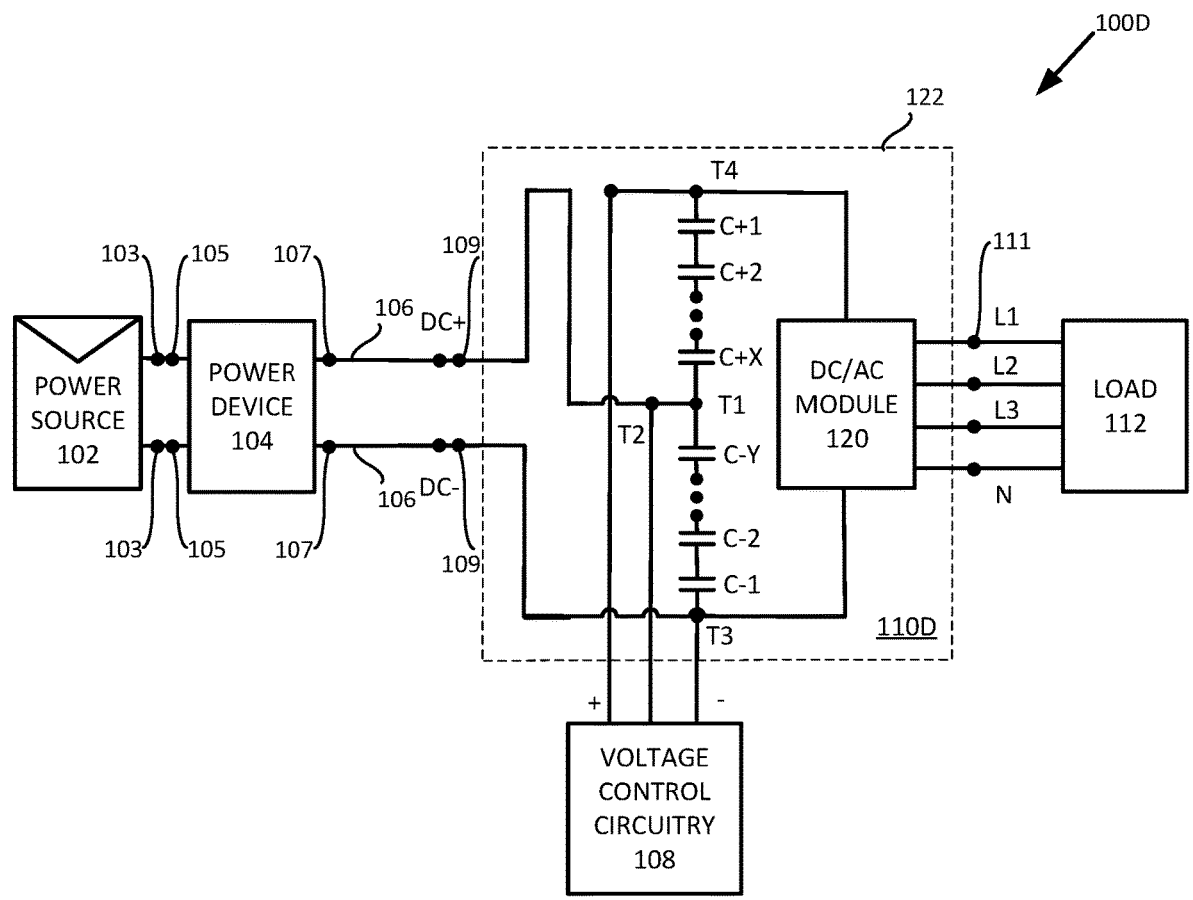
FIG. 4 shows a power system.

FIG. 4 shows a power system 100D similar to other power systems 100 shown herein, except that power system 100D is configured in an below ground potential configuration as in power system 100B and with a plurality of capacitors as arranged in power system 100C. The arrangement of system power device 110D may be similar to the arrangement of system power device 110B.

In some examples, the power system 100 may be configured to operate in a plurality of configuration modes. For example, the power system may be configured to switch between a voltage-boost configuration mode and a non-voltage-boost configuration mode. In the voltage-boost configuration mode, the voltage control circuitry 108 may be configured to increase a voltage inside a housing 122 of the system power device 110 (e.g., across the input of DC/AC module 120). In the non-voltage-boost configuration mode, the voltage control circuitry 108 might not increase a voltage inside the housing 122 of the system power device 110. In the voltage-boost configuration mode, the power system 100 may be configured to control the voltage at the midpoint terminal T1 relative to the voltage at the neutral output terminal N. In the non-voltage-boost configuration mode, the power system 100 may be configured to control the voltage at a different terminal that is not the midpoint terminal T1 (e.g., terminal T4 or terminal T3) relative to the voltage at the neutral output terminal N. The power system 100 may be configured to adjust the voltage at a terminal that is not the midpoint terminal T1 to also mitigate PID. For example, in the non-voltage-boost configuration mode, the power system 100 may be configured to adjust the voltage at terminal T3 or at terminal T4 so that it is a positive voltage or a negative voltage with regards to ground. Switches may be configured to switch the power system 100 between different configuration modes.

The term "switch" used herein refers to any appropriate reversible switching element that may be switched in a non-permanent fashion, or any appropriate irreversible switching element that may be switched in a permanent fashion. An example of a reversible switching element that may be switched in a non-permanent fashion may be any appropriate relay or switch, for example: a field effect transistor (FET), a metal oxide semiconductor field-effect transistor (MOSFET), a bipolar junction transistor (BJT), an insulated-gate bipolar transistor (IGBT), a Silicon Carbide (SiC) switch, a Gallium Nitride (GaN) switch, a diode, etc. The switch may be single throw, double throw, etc. The term "switch" may also include one or more wires (e.g., jumper wires or jump wires) that may be switched (e.g., mechanically repositioned) between the different configurations of the power system 100. An example of an irreversible switching element that may be switched in a permanent fashion is a fuse or breaker that is configured to be burned or opened according to one or more certain electrical parameters (e.g., voltage and/or current above a certain threshold). The term "burn" or "blow" used herein may refer to a situation wherein the fuse may be configured to be limited or rated to one or more certain threshold electrical parameters (e.g., voltage, current, power, etc.). If one or more electrical parameters exceeding the threshold electrical parameters are applied to the fuse, then at least a portion of the fuse may be configured to respond accordingly to open the related electrical pathway (e.g., at least a portion of the fuse may melt, disconnect, become an open circuit element, etc.). The one or more switching elements may be configured to set a configuration mode either permanently or non-permanently.

Figure 5A:
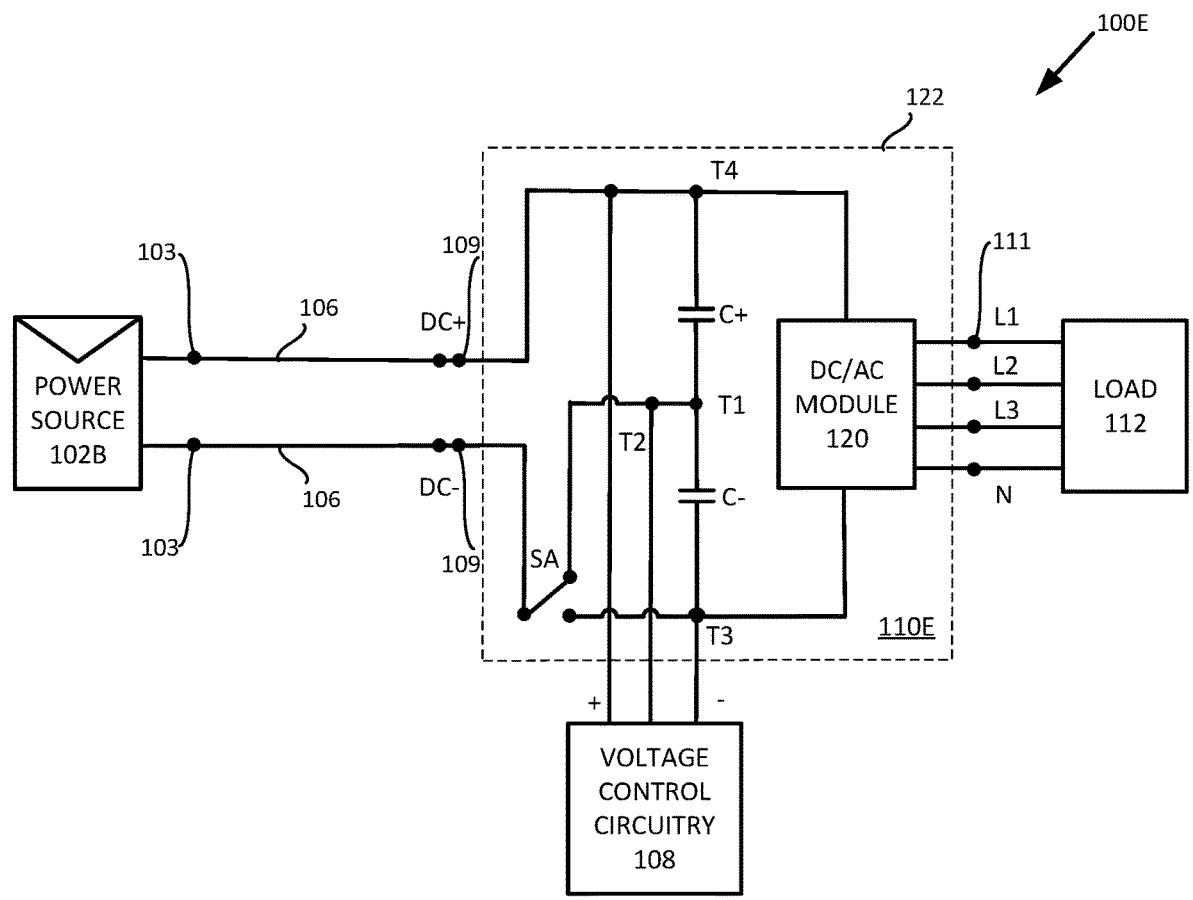
FIG. 5A shows a power system in a voltage-boost configuration mode.
Figure 5B:
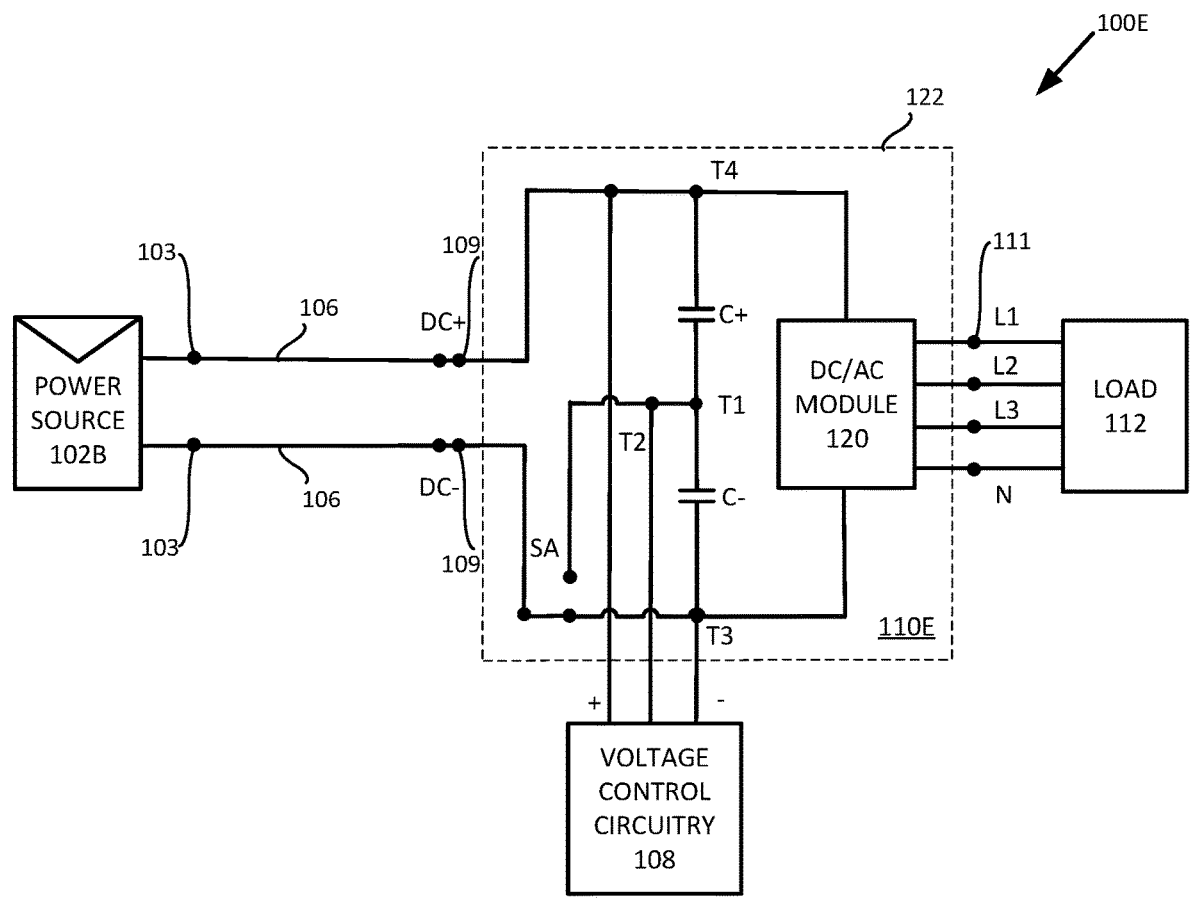
FIG. 5B shows the power system of FIG. 5A in a non-voltage-boost configuration mode.

FIG. 5A and FIG. 5B illustrate a power system 100E according to examples of the present subject matter. Power system 100E may be similar to other power systems 100 shown herein, except that power system 100E may be configured to switch between a plurality of configuration modes. Switch SA may be configured to alternatively connect terminal DC− to either terminal T2 or terminal T3. For simplicity FIG. 5A and FIG. 5B show only a single power source 102B. Power source 102B may be any appropriate arrangement of one or more power sources 102 and/or power devices 104 as described in detail above. For example, power source 102B may be a power source 102 without a power device 104 (e.g., power system 100E might not include a power device 104). As another example, power source 102B may include one or more integrated power devices 104 incorporated into the power source 102B. Other power systems 100 shown herein with power devices 104 may also be arranged without power devices 104, and vice versa. And other power systems 100 may also only show a power source 102B although one or more power devices 104 and/or additional power sources 102 may be integrated within the power source 102B.

FIG. 5A shows power system 100E in a voltage-boost configuration mode. In voltage-boost configuration mode, switch SA connects terminal DC− to terminal T2 such that voltage control circuitry 108 may increase the voltage internal to housing 122. For example, voltage control circuitry 108 may substantially double a voltage across DC/AC module 120 (e.g., the voltage across terminal T4 and terminal T3). In voltage-boost configuration mode, the voltages at the output terminals 103 of power source 102B may be maintained as equal or positive relative to a ground potential. Meaning, in this example the power system 100E is in an above ground potential configuration. The configuration mode shown in FIG. 5A may also be referred to as an above ground potential voltage-boost configuration mode. In voltage-boost configuration mode, voltage control circuitry 108 may also be configured to control the voltage at midpoint terminal T1 relative (e.g., equal) to the neutral output terminal N. The arrangement of system power device 110E when power system 100E is in voltage-boost configuration mode may be similar to the arrangement of system power device 110A.

FIG. 5B shows power system 100E in a non-voltage-boost configuration mode. In the non-voltage-boost configuration mode, switch SA connects terminal DC− to terminal T3 such that voltage control circuitry 108 might not increase the voltage internal to housing 122. For example, voltage control circuitry 108 may not double a voltage across DC/AC module 120. In non-voltage-boost configuration mode, power system 100E may also be configured to control the voltage at terminal T3 or the voltage at terminal T4 relative to the neutral output terminal N. For example, in non-voltage-boost configuration mode, the voltages at both output terminals 103 of power source 102B may or might not be maintained as positive relative to a ground potential or as negative relative to a ground potential.

As an example, if switch SA is a jumper wire then, then in the voltage-boost configuration mode, terminal DC− may be connected to terminal T2 via the jumper wire, and in the non-voltage-boost configuration mode, terminal DC− may be connected to terminal T3 via the jumper wire.

Figure 6A:
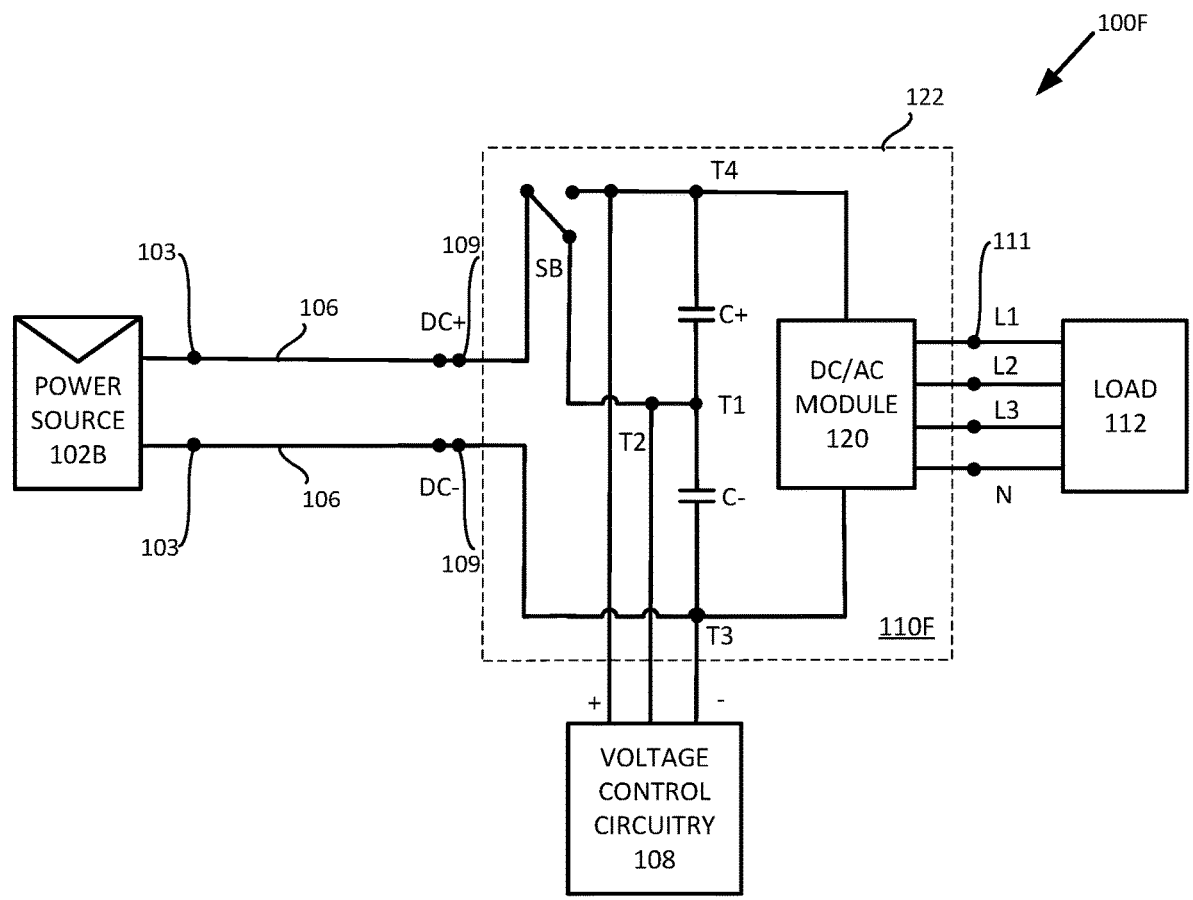
FIG. 6A shows a power system in a voltage-boost configuration mode.
Figure 6B:
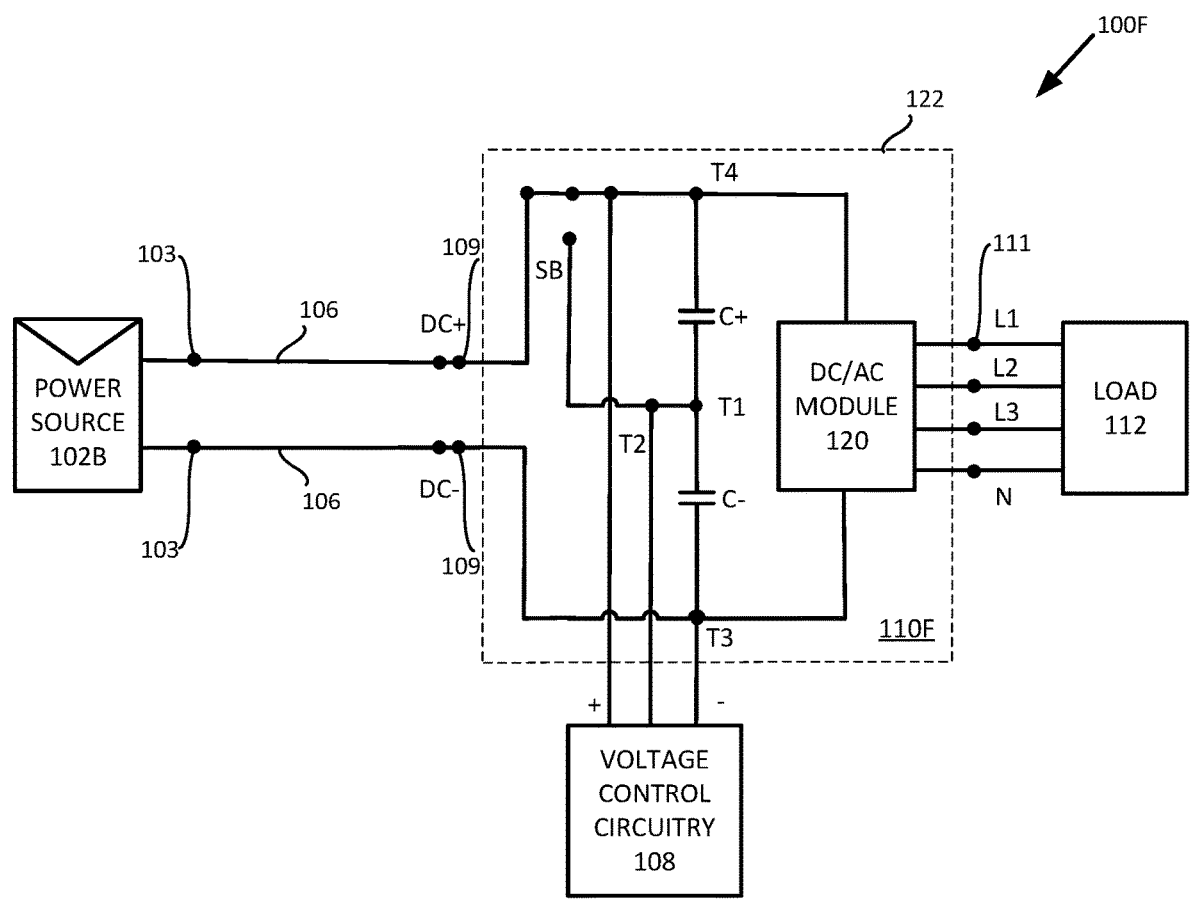
FIG. 6B shows the power system of FIG. 6A in a non-voltage-boost configuration mode.

FIG. 6A and FIG. 6B illustrate a power system 100F according to examples of the present subject matter. Power system 100F may be similar to other power systems 100 shown herein, except that power system 100F may be configured to switch between a below ground potential voltage-boost configuration mode and a non-voltage-boost configuration mode. Switch SB may be configured to connect terminal DC+ alternatively to terminal T2 or terminal T4.

FIG. 6A shows power system 100F in a voltage-boost configuration mode. In voltage-boost configuration mode, switch SB connects terminal DC+ to terminal T2 such that voltage control circuitry 108 may increase the voltage internal to housing 122. For example, voltage control circuitry 108 may double a voltage across DC/AC module 120. In voltage-boost configuration mode, the voltages at the output terminals 103 of power source 102B may be maintained as equal or negative relative to a ground potential. Meaning, in this example the power system 100F is in a below ground potential configuration. The configuration mode shown in FIG. 6A may also be referred to as a below ground potential voltage-boost configuration mode. In voltage-boost configuration mode, voltage control circuitry 108 may also be configured to control the voltage at midpoint terminal T1 relative (e.g., equal) to the neutral output terminal N. The arrangement of system power device 110F when power system 100F is in voltage-boost configuration mode may be similar to the arrangement of system power device 110B.

FIG. 6B shows power system 100F in a non-voltage-boost configuration mode. In the non-voltage-boost configuration mode, switch SB connects terminal DC+ to terminal T4 such that voltage control circuitry 108 does not increase the voltage internal to housing 122. For example, voltage control circuitry 108 may not double a voltage across DC/AC module 120. In non-voltage-boost configuration mode, power system 100F may also be configured to control the voltage at terminal T3 or the voltage at terminal T4 relative to the neutral output terminal N. For example, in non-voltage-boost configuration mode, the voltages at both output terminals 103 of power source 102B may or might not be maintained as positive relative to a ground potential or as negative relative to a ground potential.

Figure 7A:
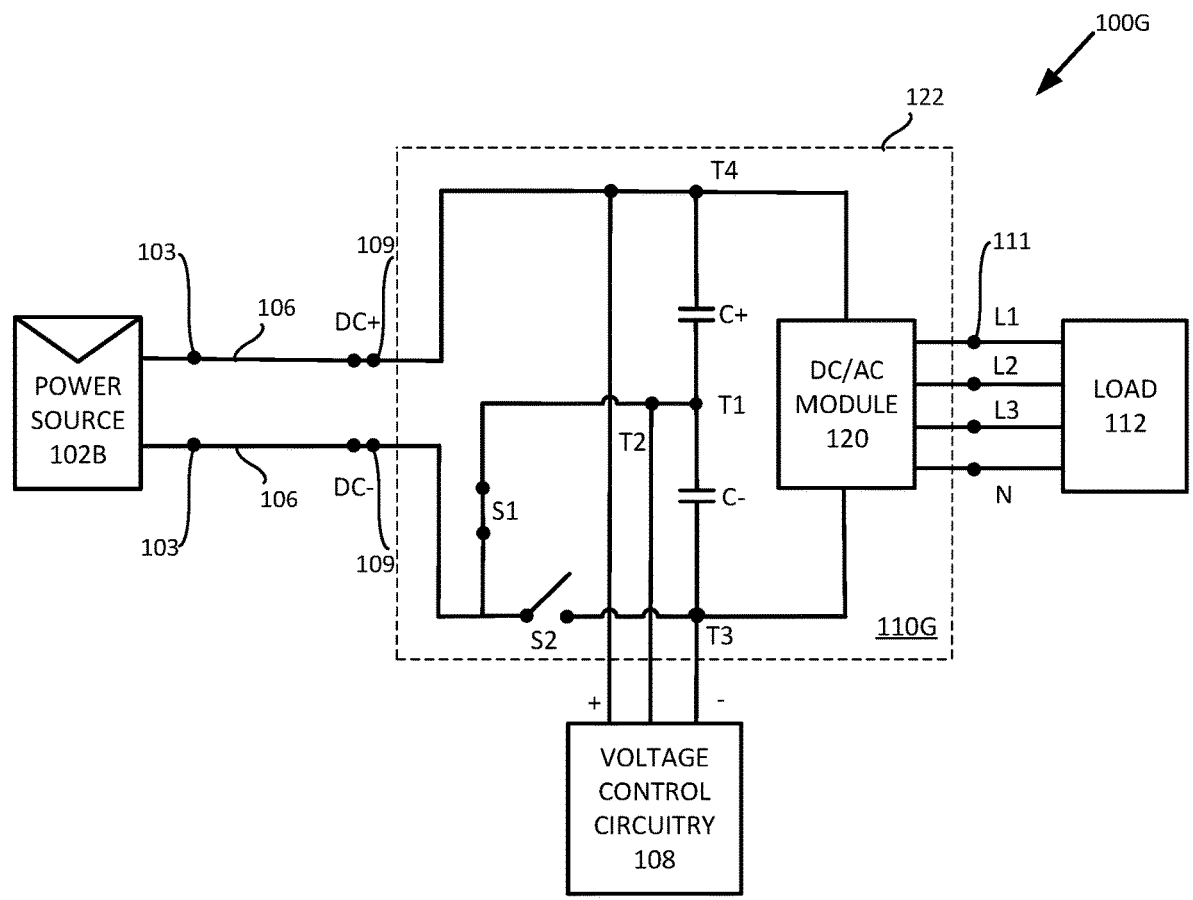
FIG. 7A shows a power system in a voltage-boost configuration mode.
Figure 7B:
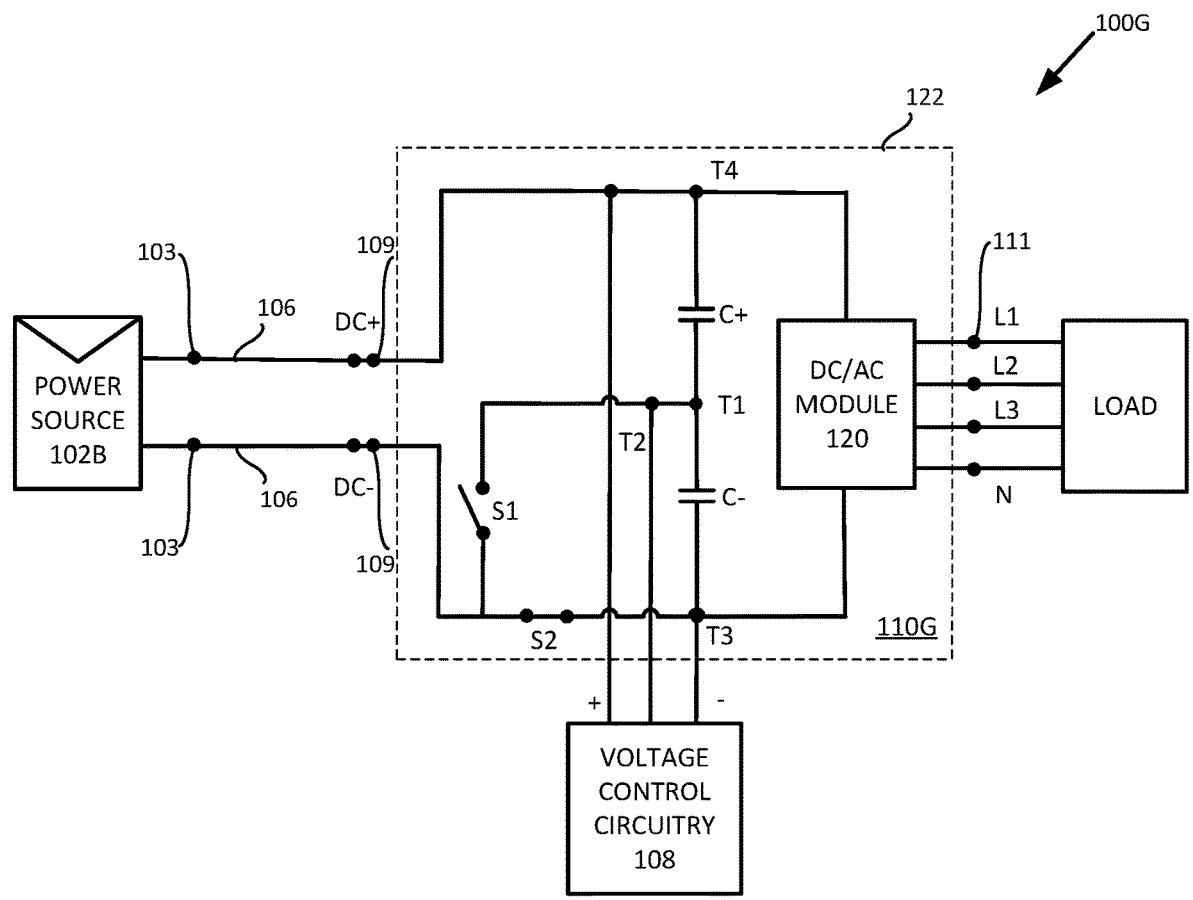
FIG. 7B shows the power system of FIG. 7A in a non-voltage-boost configuration mode.

FIG. 7A and FIG. 7B illustrate a power system 100G according to examples of the present subject matter. Power system 100G may be similar to other power systems 100 shown herein, except that power system 100G may include a plurality of switches, S1 and S2, configured to switch the power system 100G between the different configuration modes. Switch S1 may be configured to alternatively connect terminal DC− to, or to disconnect terminal DC− from, terminal T2. Switch S2 may be configured to alternatively connect terminal DC− to, or to disconnect terminal DC− from, terminal T3. Switches S1 and S2 may be configured to alternatingly switch power system 100G between a voltage-boost configuration mode, that may be an above ground potential configuration mode, and a non-voltage-boost configuration mode. For example, power system 100G may be configured to switch into a voltage-boost configuration mode by switching switch S1 "ON" to create a closed circuit and connect terminal DC− to terminal T2, and switching switch S2 "OFF" to disconnect (e.g., create an open circuit) between terminal DC− and terminal T3, as shown in FIG. 7A. Power system 100G may also be configured to switch into a non-voltage-boost configuration mode by switching switch S1 "OFF" to disconnect (e.g., create an open circuit between) terminal DC− and terminal T2, and by switching switch S2 "ON" to create a closed circuit and connect terminal DC− and terminal T3, as shown in FIG. 7B. Switches S1 and S2 may be two separate switches or may be combined into a single pole double throw switch that alternates between connecting terminal DC− to either terminal T2 or terminal T3. The arrangement of system power device 110G when power system 100G is in voltage-boost configuration mode may be similar to the arrangement of system power device 110A.

Figure 8A:
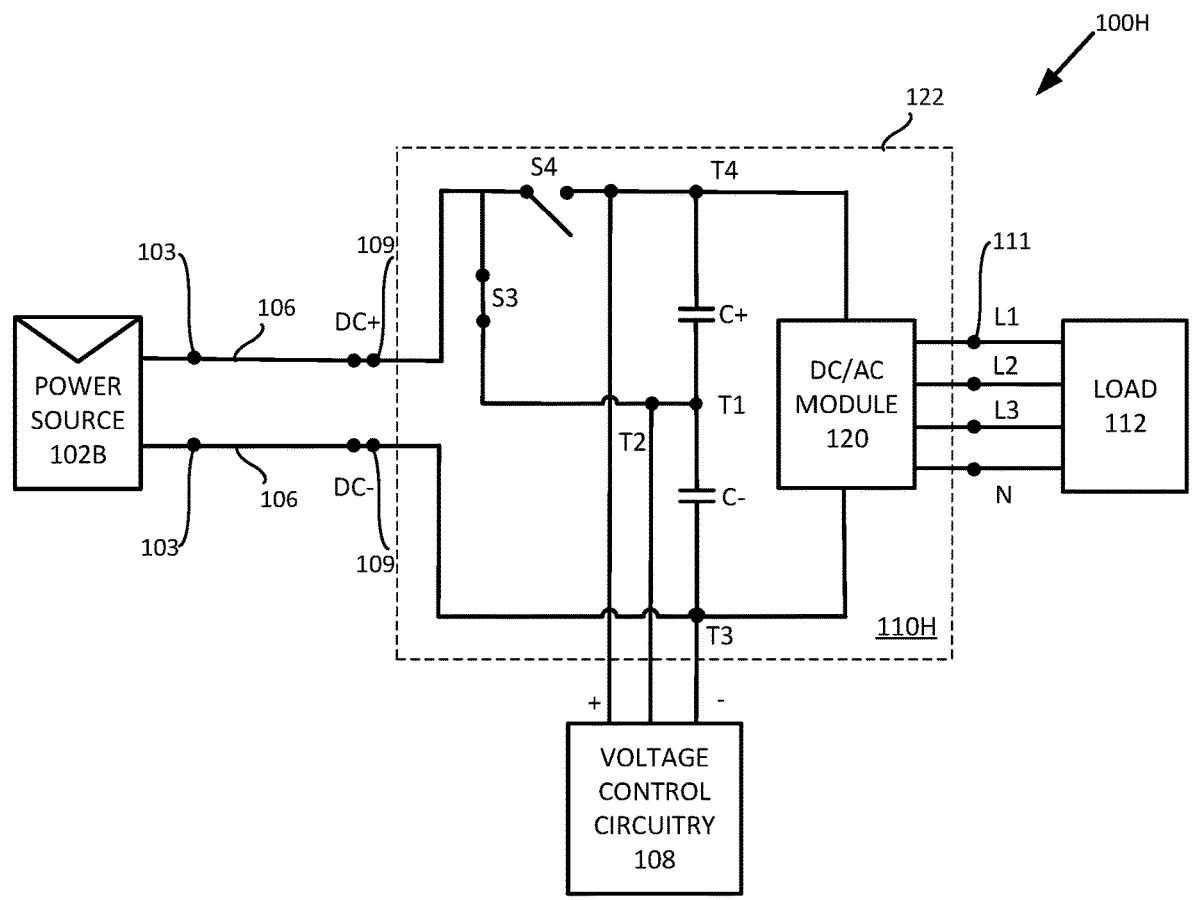
FIG. 8A shows a power system in a voltage-boost configuration mode.
Figure 8B:
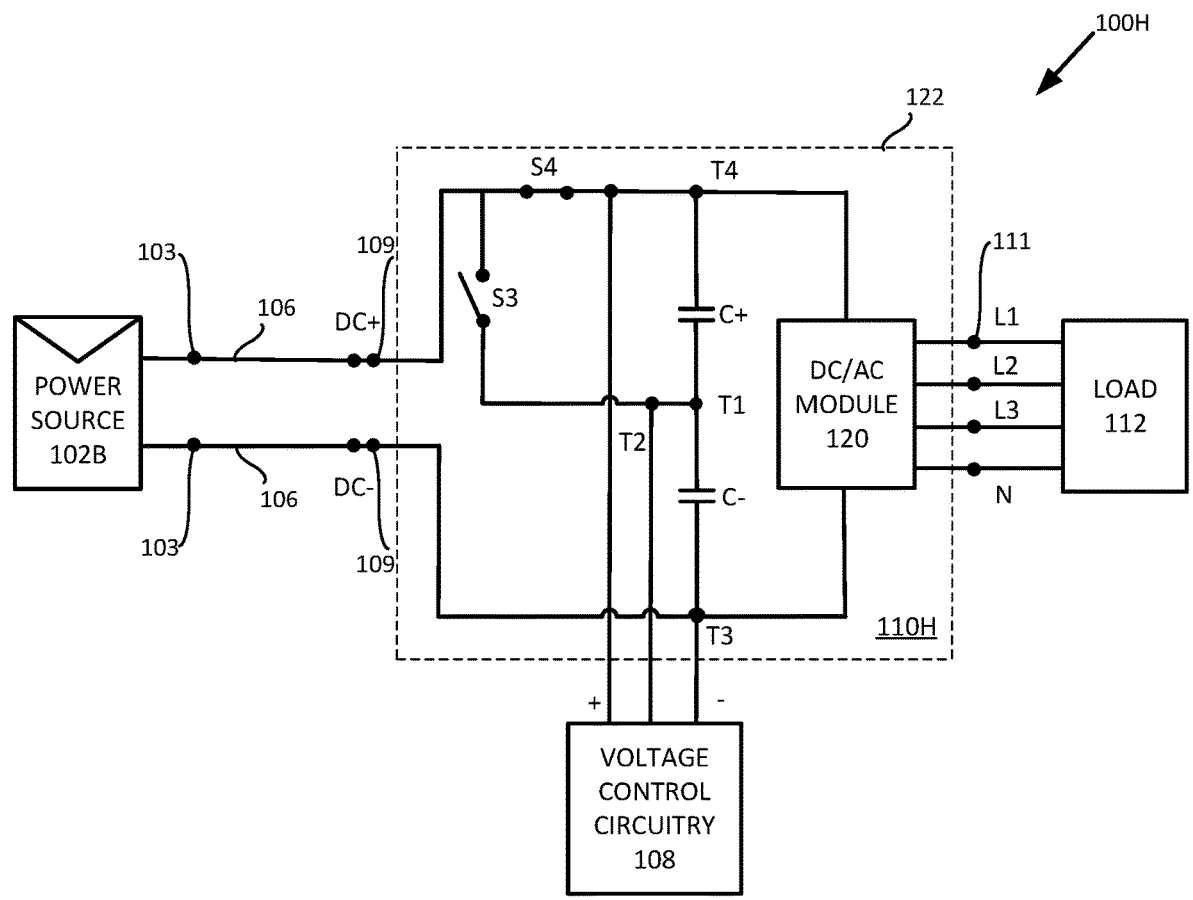
FIG. 8B shows the power system of FIG. 8A in a non-voltage-boost configuration mode.

FIG. 8A and FIG. 8B illustrate a power system 100H according to examples of the present subject matter. Power system 100H may be similar to other power systems 100 shown herein, except that power system 100H may include a plurality of switches, S3 and S4, configured to switch the power system 100H between a voltage-boost configuration mode, that may be a below ground potential configuration mode, and a non-voltage-boost configuration mode. Switch S3 may be configured to connect terminal DC+ to, or to disconnect terminal DC+ from, terminal T2. Switch S4 may be configured to connect terminal DC+ to, or to disconnect terminal DC+ from, terminal T4. Switches S3 and S4 may be configured to alternatingly switch power system 100H between the different configuration modes. For example, power system 100H may be configured to switch into a voltage-boost configuration mode by switching switch S3 "ON" to create a closed circuit and to connect terminal DC+ to terminal T2, and by switching switch S4 "OFF" to disconnect (e.g., create an open circuit between) terminal DC+ from terminal T4 (as shown in FIG. 8A). Power system 100H may also be configured to switch into a non-voltage-boost configuration mode by switching switch S3 "OFF" to disconnect (e.g., create an open circuit between) terminal DC+ from terminal T2, and by switching switch S4 "ON" to create a closed circuit and to connect terminal DC+ to terminal T4 (as shown in FIG. 8B). Switches S3 and S4 may be two separate switches or may be combined into a single pole double throw switch that alternates between connecting terminal DC− to either terminal T2 or terminal T4. The arrangement of system power device 110H when power system 100H is in voltage-boost configuration mode may be similar to the arrangement of system power device 110B.

Figure 9A:
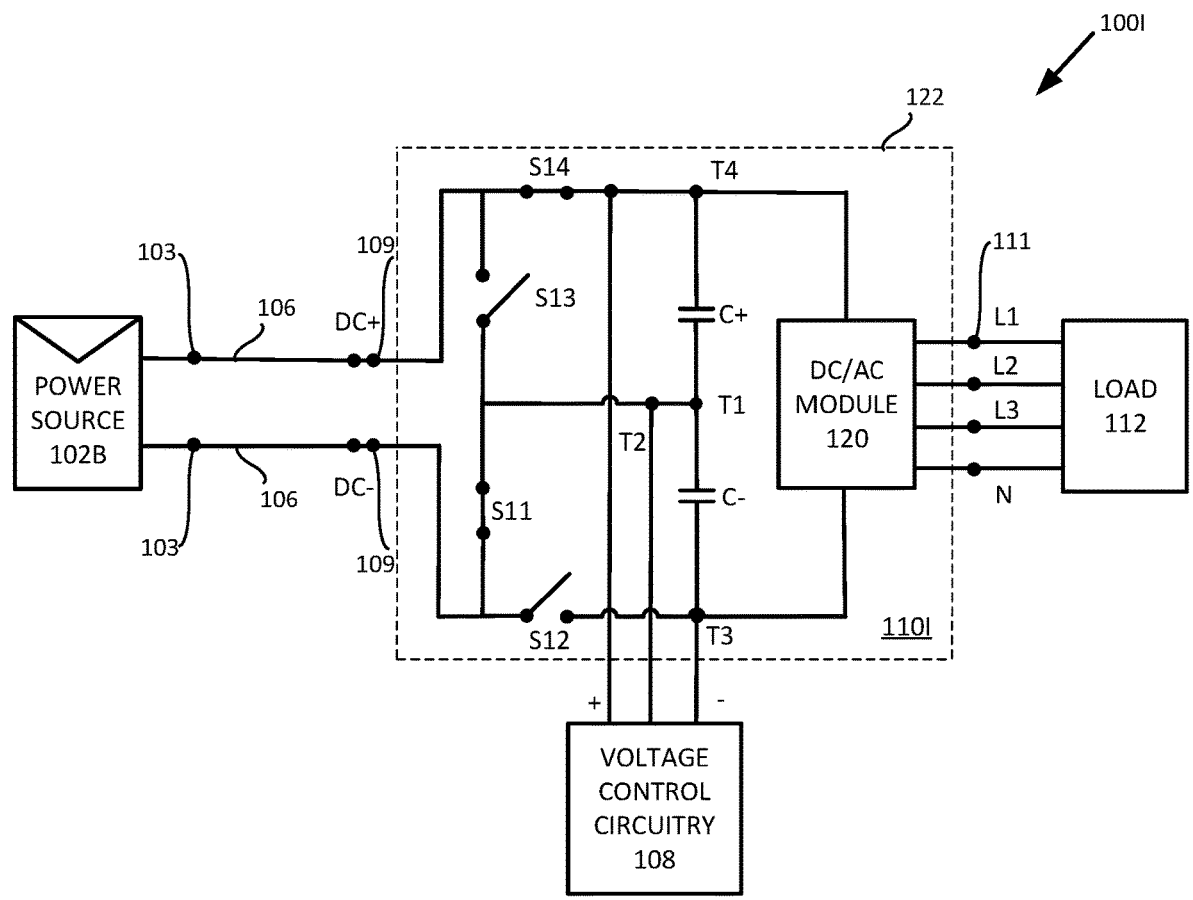
FIG. 9A shows a power system in an above ground potential configuration mode.
Figure 9B:
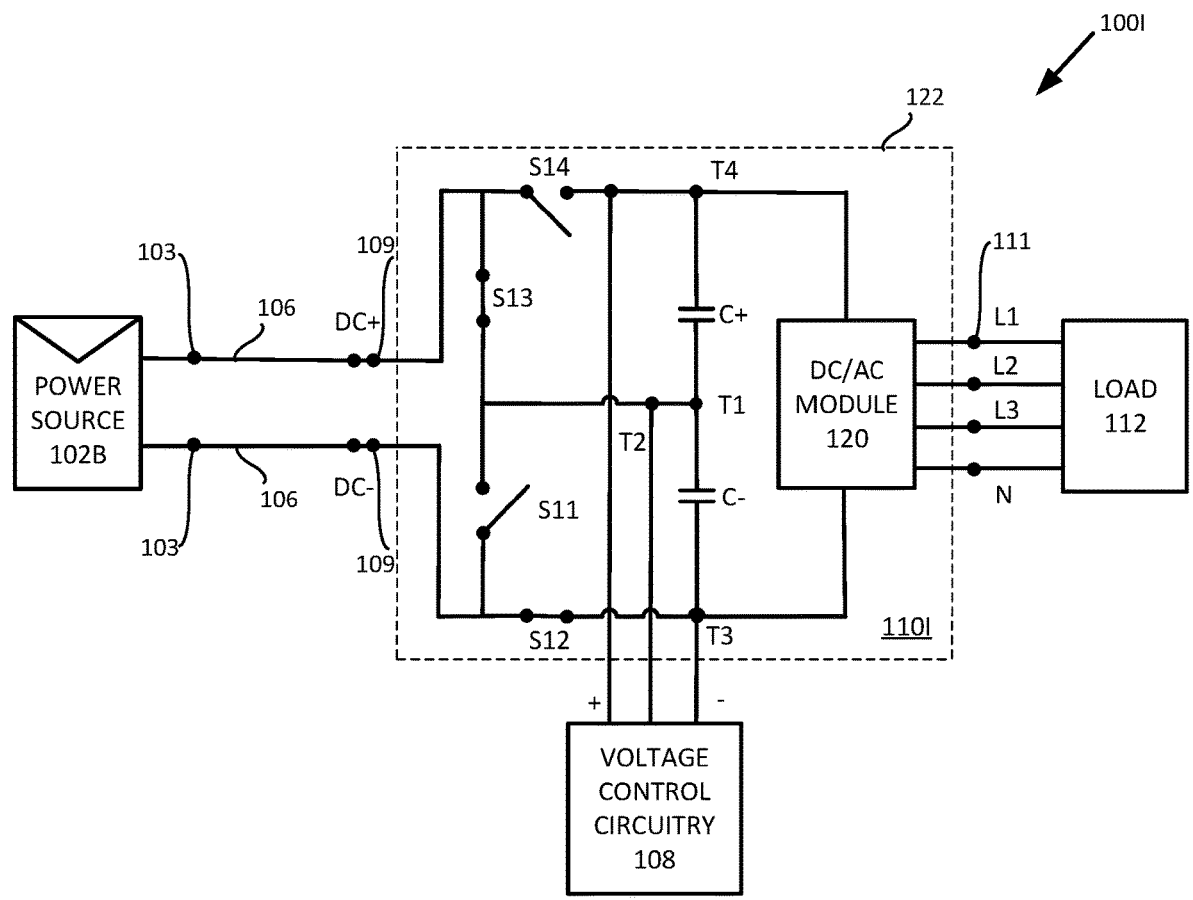
FIG. 9B shows the power system of FIG. 9A in a below ground potential configuration mode.
Figure 9C:
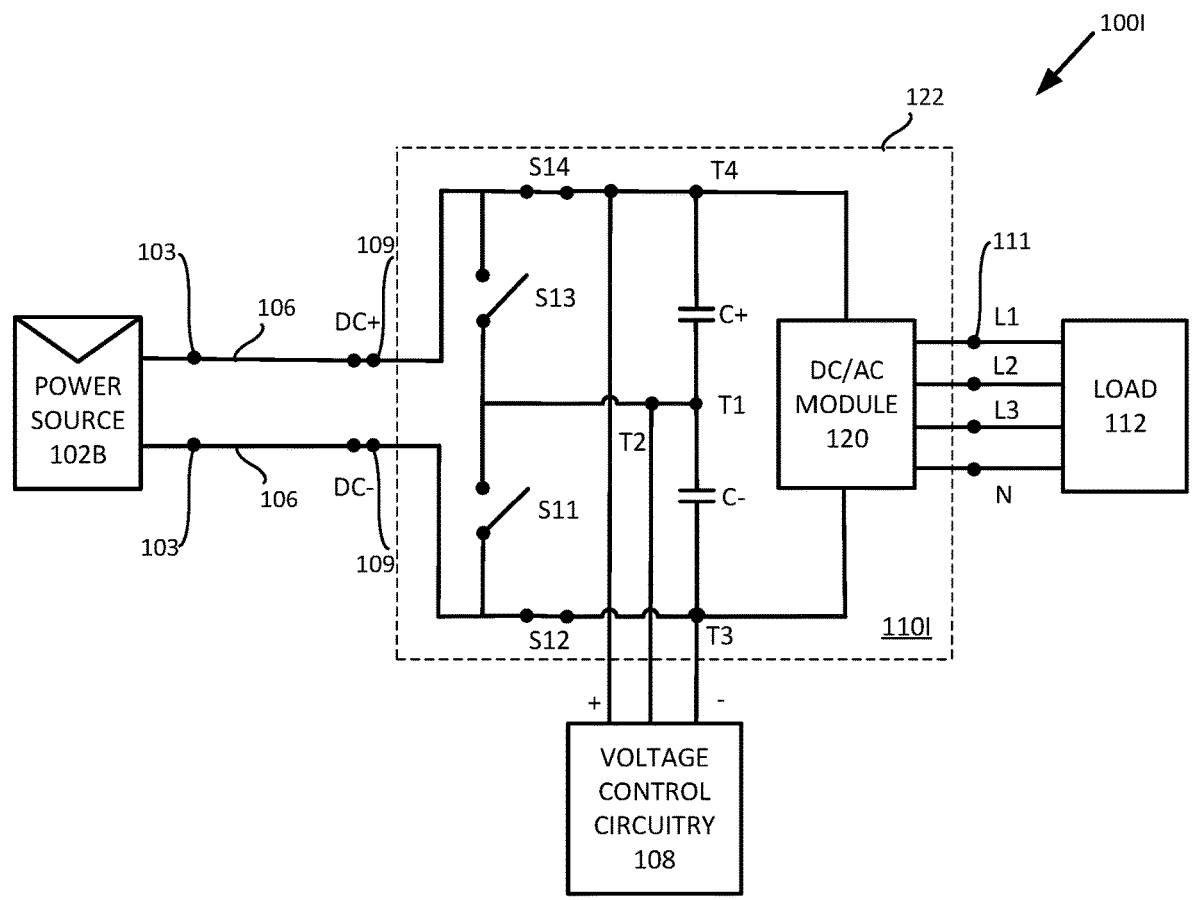
FIG. 9C shows the power system of FIG. 9A in a non-voltage-boost configuration mode.

FIG. 9A, FIG. 9B, and FIG. 9C illustrate a power system 100I according to examples of the present subject matter. Power system 100I may be similar to other power systems 100 shown herein, except that power system 100I may include a plurality of switches, S11, S12, S13, and S14, configured to switch the power system 100I between different configuration modes, for example: an above ground potential voltage-boost configuration mode, a below ground potential voltage-boost configuration mode, a non-voltage-boost configuration mode, etc. Switch S11 may be configured to connect terminal DC− to, and to disconnect terminal DC− from, terminal T2. Switch S12 may be configured to connect terminal DC− to, and to disconnect terminal DC− from, terminal T3. Switch S13 may be configured to connect terminal DC+ to, and to disconnect terminal DC+ from, terminal T2. Switch S14 may be configured to connect terminal DC+ to, and to disconnect terminal DC+ from, terminal T4. Switches S11, S12, S13, and S14 may be configured to alternatingly switch power system 100I between the different configuration modes. For example, power system 100I may be configured to switch into an above ground potential voltage-boost configuration mode by switching switch S11 "ON" to create a closed circuit and to connect terminal DC− to terminal T2, by switching switch S12 "OFF" to disconnect (e.g., create an open circuit) terminal DC− from terminal T3, by switching switch S13 "OFF" to disconnect (e.g., create an open circuit) terminal DC+ from terminal T2, and by switching switch S14 "ON" to create a closed circuit and connect terminal DC+ to terminal T4 (as shown in FIG. 9A). Power system 100I may also be configured to switch into a below ground potential voltage-boost configuration mode by switching switch S11 "OFF" to disconnect (e.g., create an open circuit) terminal DC− from terminal T2, by switching switch S12 "ON" to create a closed circuit and to connect terminal DC− to terminal T3, by switching switch S13 "ON" to create a closed circuit and to connect terminal DC+ to terminal T2, and by switching switch S14 "OFF" to disconnect (e.g., create an open circuit) terminal DC+ from terminal T4 (as shown in FIG. 9B). Power system 100I may also be configured to switch into a non-voltage-boost configuration mode by switching switch S11 "OFF" to disconnect (e.g., create an open circuit) terminal DC− from terminal T2, by switching switch S12 "ON" to create a closed circuit and to connect terminal DC− to terminal T3, by switching switch S13 "OFF" to disconnect (e.g., create an open circuit) terminal DC+ from terminal T2, and by switching switch S14 "ON" to create a closed circuit and to connect terminal DC+ to terminal T4 (as shown in FIG. 9C). The arrangement of system power device 110I when power system 100I is in above ground potential voltage-boost configuration mode may be similar to the arrangement of system power device 110A. The arrangement of system power device 110I when power system 100I is in below ground potential voltage-boost configuration mode may be similar to the arrangement of system power device 110B.

Figure 10A:
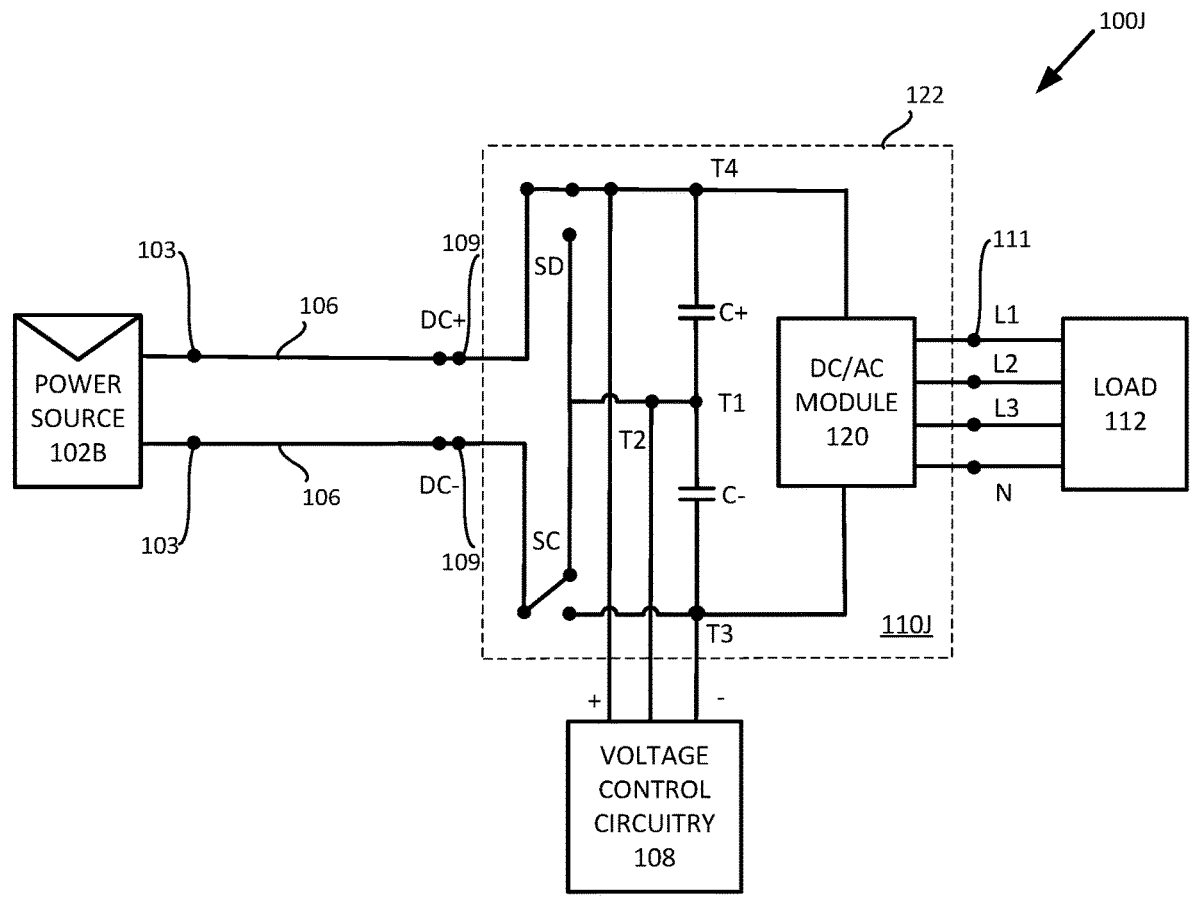
FIG. 10A shows a power system in an above ground potential configuration mode.
Figure 10B:
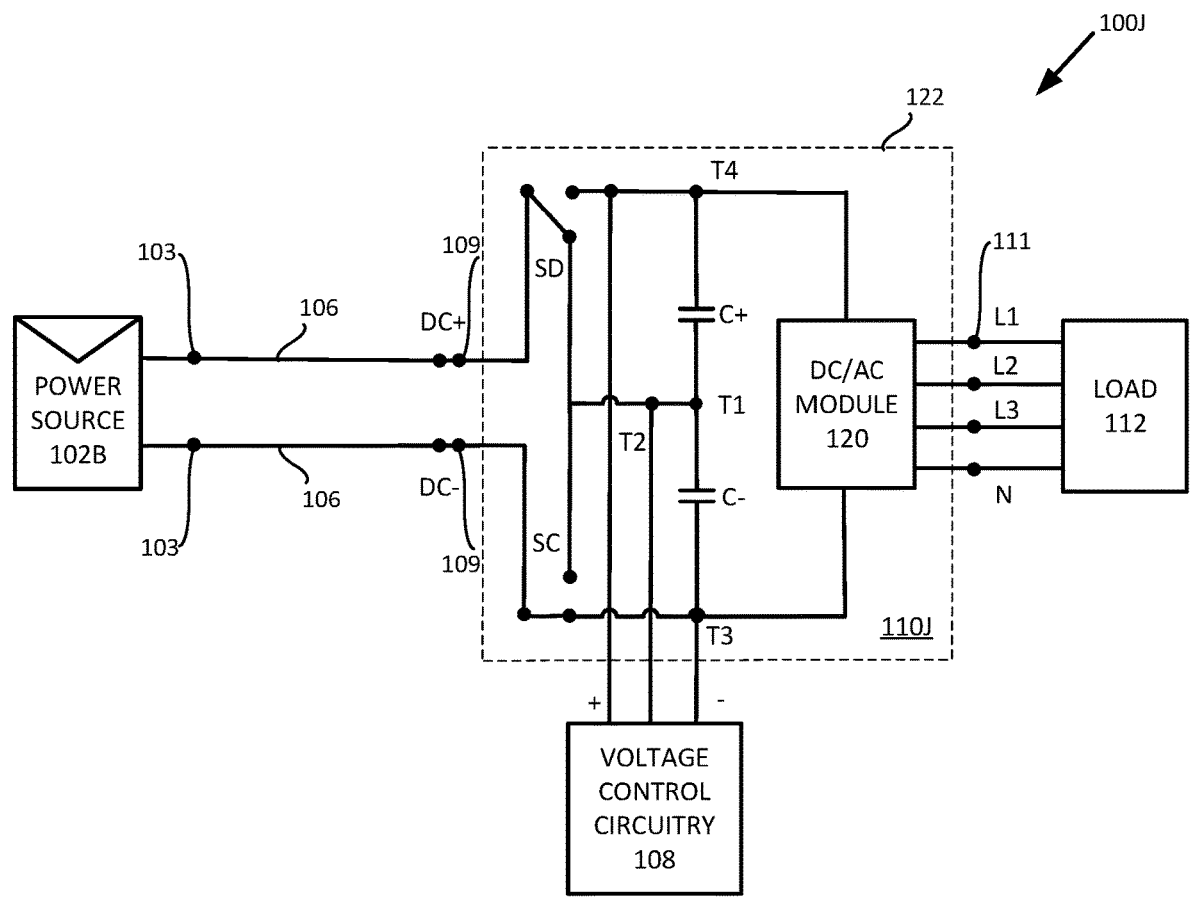
FIG. 10B shows the power system of FIG. 10A in a below ground potential configuration mode.
Figure 10C:
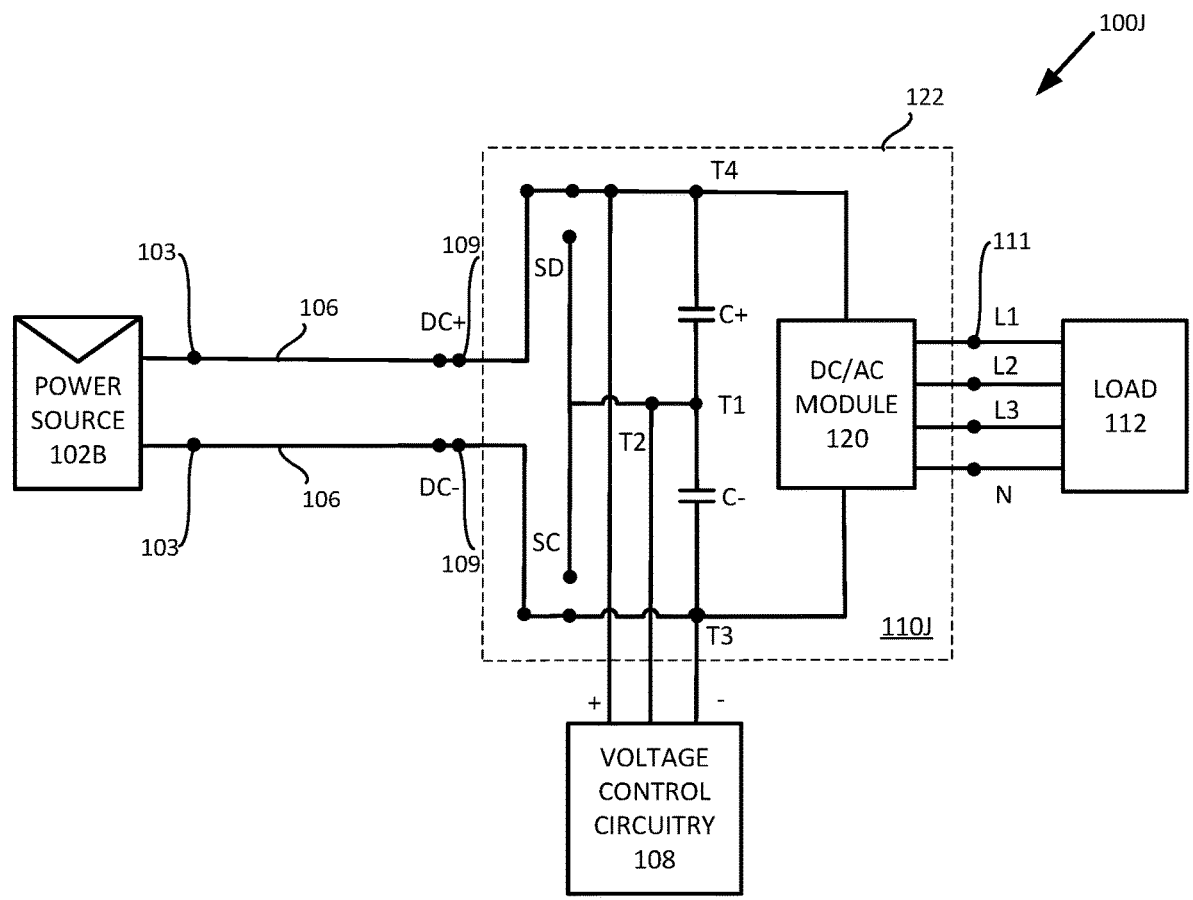
FIG. 10C shows the power system of FIG. 10A in a non-voltage-boost configuration mode.

FIG. 10A, FIG. 10B, and FIG. 10C illustrate a power system 100J according to examples of the present subject matter. Power system 100J may be similar to other power systems 100 shown herein, except that power system 100J may include a pair of switches, SC and SD, configured to switch the power system 100J between different configuration modes, for example: an above ground potential voltage-boost configuration mode, a below ground potential voltage-boost configuration mode, a non-voltage-boost configuration mode, etc. Switch SC may be configured to connect terminal DC−, alternatively, either to terminal T2 or to terminal T3. Switch SD may be configured to connect terminal DC+, alternatively, to either terminal T2 or to terminal T4. Switches SC and SD may be configured to alternatingly switch power system 100J between the different configuration modes. For example, power system 100J may be configured to switch into an above ground potential voltage-boost configuration mode by switching switch SC to create a closed circuit and to connect terminal DC− to terminal T2 (e.g., create an open circuit) and to disconnect terminal DC− from terminal T3, and by switching switch SD to disconnect (e.g., create an open circuit) terminal DC+ from terminal T2, thereby also creating a closed circuit, and to connect terminal DC+ to terminal T4, as shown in FIG. 10A. Power system 100J may also be configured to switch into a below ground potential voltage-boost configuration mode by switching switch SC to disconnect (e.g, create an open circuit) terminal DC− from terminal T2, thereby creating a closed circuit, and to connect terminal DC− to terminal T3, and by switching switch SD to create a closed circuit and to connect terminal DC+ to terminal T2, thereby also disconnecting terminal DC+ from terminal T4, as shown in FIG. 10B. Power system 100J may also be configured to switch into a non-voltage-boost configuration mode by switching switch SC to create an open circuit and to disconnect terminal DC− from terminal T2 (thereby also creating a closed circuit and connecting terminal DC− to terminal T3), and by switching switch SD to create an open circuit and to disconnect terminal DC+ from terminal T2 (thereby also creating a closed circuit and connecting terminal DC+ to terminal T4), as shown in FIG. 10C. The arrangement of system power device 110J when power system 100J is in above ground potential voltage-boost configuration mode may be similar to the arrangement of system power device 110A. The arrangement of system power device 110J when power system 100J is in below ground potential voltage-boost configuration mode may be similar to the arrangement of system power device 110B.

In some examples, the power system 100 may be configured to switch between different voltage-boost configuration modes (e.g., above ground potential or below ground potential), without a non-voltage-boost configuration mode.

The voltage control circuitry 108 may be configured to mitigate PID since the AC output of the system power device 110 is grounded (e.g., there is a neutral output line N connected to ground potential). Since the power system 100 is an AC grounded system, the potential at terminal T1 may be maintained at about 0 volts relative to ground potential and the voltage across the power source 102B may be maintained as either about zero or entirely positive relative to ground (e.g., about +400 volts), or about zero or entirely negative relative to ground (e.g., about −400 volts). An about zero or entirely negative potential with regard to ground may be beneficial with certain power sources 102 (for example, certain photovoltaic modules). Since the potential across the power source 102 is maintained about entirely above ground or about entirely below ground, then PID might be mitigated.

In cases where the AC is not grounded, the power system 100 may include additional circuitry to help maintain the voltage at terminal T1 at about 0 volts. In some cases where the AC is not grounded, this additional circuitry may be configured to mitigate PID.

Figure 11:
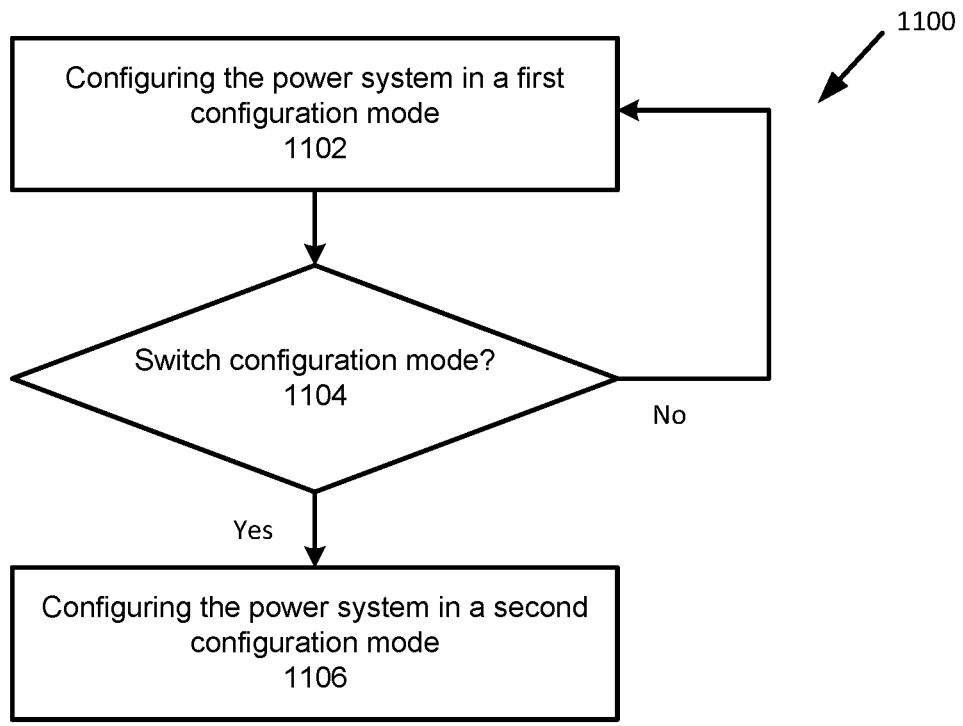
FIG. 11 shows a flow chart of a method.

FIG. 11 shows a flow chart 1100 of a method, according to one or more examples of the present subject matter.

In step 1102, the power system 100 is configured in a first configuration mode. For example, the power system 100 may be configured in a voltage-boost configuration mode or a non-voltage-boost configuration mode. If in a voltage-boost configuration mode, the power system 100 may be configured in an above ground potential configuration mode or a below ground configuration mode.

In step 1104, a decision may be made whether the configuration mode of power system 100 should be switched. This step may be performed using one or more controllers 116 and sensors of the power system. For example, the sensors may provide one or more parameters to the controller 116 that may be used to help determine whether the configuration mode of the power system 100 should be switched. For example, the determination may be based on a parameter related to a voltage of the power system 100.

If in step 1104 the decision is that the configuration mode of the power system 100 should not be switched, then the process 1100 may return to step 1102.

If in step 1104 the decision is that the configuration mode of the power system 100 should be switched, then the process 1100 may proceed to step 1106.

In step 1106, the power system 100 is configured in a second configuration mode. In step 1106, the power system 100 may be switched from the first configuration mode to the second configuration mode. This step may be performed using one or more switches and voltage control circuitry 108 of the power system 100. For example, the one or more switches may obtain one or more signals from the one or more controllers 116, including instructions to change the configuration mode of the power system 100. For example, the one or more switches may be configured to switch the configuration mode to a voltage-boost configuration mode or a non-voltage-boost configuration mode. The voltage-boost configuration mode may be an above ground potential configuration mode or a below ground configuration mode. In this way the power system 100 may be switched between the different configuration modes, for example, depending on which configuration mode may be the most advantageous at the time.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A system comprising:
an inverter configured to convert a direct current (DC) input to an alternating current (AC) output, the inverter comprising:
a DC/AC module configured to convert the DC input to the AC output,
first and second capacitors connected at an input of the DC/AC module, and
a housing configured to house the DC/AC module and the first and the second capacitors;
voltage control circuitry connected to a first terminal of the first capacitor, a first terminal of the second capacitor, and a midpoint terminal between a second terminal of the first capacitor and a second terminal of the second capacitor, wherein the voltage control circuitry is configured to increase a voltage at the input of the DC/AC module inside the housing of the inverter; and
a power source including output terminals connected respectively to the first terminal of the first capacitor and the midpoint terminal.

2. The system of claim 1, wherein the voltage control circuitry is configured to convert a second DC input to a DC output across the first capacitor and the second capacitor.

3. The system of claim 1, wherein the DC/AC module further comprises a plurality of output terminals.

4. The system of claim 3, wherein the plurality of output terminals includes at least two AC phase output terminals.

5. The system of claim 3, wherein the plurality of output terminals includes a neutral output terminal.

6. The system of claim 5, wherein the neutral output terminal is connected to a ground potential.

7. The system of claim 6, wherein the voltage control circuitry is further configured to control a voltage at the midpoint terminal relative to the neutral output terminal.

8. The system of claim 1, wherein the power source is a photovoltaic power source.

9. The system of claim 1, wherein the voltage control circuitry is configured to maintain a zero or positive voltage with respect to a ground potential at each of the output terminals of the power source.

10. The system of claim 1, wherein the voltage control circuitry is configured to maintain a zero or negative voltage with respect to a ground potential at each of the output terminals of the power source.

11. The system of claim 1, wherein the voltage control circuitry is configured to double the voltage at the input of the DC/AC module with respect to voltage output by the power source.

12. The system of claim 1, wherein the system is configured to switch between a plurality of configuration modes.

13. The system of claim 12, wherein the plurality of configuration modes include at least two of: an above ground potential voltage-boost configuration mode, a below ground potential voltage-boost configuration mode, and a non-voltage-boost configuration mode.

14. The system of claim 12, further comprising one or more switches configured to switch the system between the plurality of configuration modes.

15. An apparatus comprising:
voltage control circuitry comprising:
a first output terminal configured to be connected to a first terminal of a first capacitor of a system power device, a second output terminal configured to be connected to a first terminal of a second capacitor of the system power device, and a third output terminal, between the first output terminal and the second output terminal, configured to be connected to a midpoint terminal between a second terminal of the first capacitor and a second terminal of the second capacitor, wherein the voltage control circuitry is configured to increase a voltage across the first capacitor and the second capacitor inside a housing of the system power device; and one or more switches configured to switch the apparatus between a plurality of configuration modes, wherein the plurality of configuration modes comprise at least two of: an above ground potential voltage-boost configuration mode, a below ground potential voltage-boost configuration mode, and a non-voltage-boost configuration mode.

16. The apparatus of claim 15, wherein the voltage control circuitry is configured to convert a direct current (DC) input to a DC output, and substantially double the voltage across the first capacitor and the second capacitor relative to a DC voltage across an exterior input of the system power device.

17. A method comprising:
connecting a first output terminal of a voltage control circuitry to a first terminal of a first capacitor of a system power device;
connecting a second output terminal of the voltage control circuitry to a first terminal of a second capacitor of the system power device;
connecting a third output terminal of the voltage control circuitry, between the first output terminal and the second output terminal, to a midpoint terminal between a second terminal of the first capacitor and a second terminal of the second capacitor;
connecting a first terminal of a power source to the first terminal of the first capacitor;
connecting a second terminal of the power source to the midpoint terminal; and increasing, using the voltage control circuitry, a voltage across the first capacitor and the second capacitor inside a housing of the system power device.

18. A system comprising:
an inverter configured to convert a direct current (DC) input to an alternating current (AC) output, the inverter comprising:
a DC/AC module configured to convert the DC input to the AC output,
first and second capacitors connected at an input of the DC/AC module, and
a housing configured to house the DC/AC module and the first and the second capacitors; and
voltage control circuitry connected to a first terminal of the first capacitor, a first terminal of the second capacitor, and a midpoint terminal between a second terminal of the first capacitor and a second terminal of the second capacitor;
wherein:
the voltage control circuitry is configured to increase a voltage at the input of the DC/AC module inside the housing of the inverter, and
the system is configured to switch between a plurality of configuration modes comprising at least two of: an above ground potential voltage-boost configuration mode, a below ground potential voltage-boost configuration mode, and a non-voltage-boost configuration mode.

19. The system of claim 18, wherein the voltage control circuitry is further configured to control a voltage at the midpoint terminal relative to a neutral output terminal.

20. The system of claim 18, further comprising one or more switches configured to switch the system between the plurality of configuration modes.

* * * * *